US012795067B2

(12) United States Patent
Lin et al.

(10) Patent No.: US 12,795,067 B2
(45) Date of Patent: Nov. 10, 2026

(54) ENCODING METHOD AND APPARATUS, AND DECODING METHOD AND APPARATUS

(71) Applicant: HUAWEI TECHNOLOGIES CO., LTD., Shenzhen (CN)

(72) Inventors: Zehui Lin, Shenzhen (CN); Kangying Cai, Beijing (CN); Yunneng Mo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 18/830,801

(22) Filed: Sep. 11, 2024

(65) Prior Publication Data

US 2024/0430403 A1 Dec. 26, 2024

Related U.S. Application Data

(63) Continuation of application No. PCT/CN2023/071501, filed on Jan. 10, 2023.

(30) Foreign Application Priority Data

Mar. 15, 2022 (CN) ......................... 202210254651.8

(51) Int. Cl.
*H04N 19/103* (2014.01)
*H04N 19/119* (2014.01)
(Continued)

(52) U.S. Cl.
CPC ......... *H04N 19/103* (2014.11); *H04N 19/119* (2014.11); *H04N 19/172* (2014.11); *H04N 19/597* (2014.11)

(58) Field of Classification Search
CPC .. H04N 19/103; H04N 19/119; H04N 19/172; H04N 19/597; H04N 19/17; H04N 19/21; H04N 19/147; G06T 9/00
See application file for complete search history.

(56) References Cited

U.S. PATENT DOCUMENTS

2020/0026896 A1 1/2020 Debates et al.
2020/0312018 A1 10/2020 Mcguire et al.
(Continued)

FOREIGN PATENT DOCUMENTS

CN 103329530 A 9/2013
CN 112999656 A 6/2021
(Continued)

OTHER PUBLICATIONS

Michael Stengel et al:"A Distributed, Decoupled System for Losslessly Streaming Dynamic Light Probes to Thin Clients." arXiv:2103.05875v1 [cs.DC] Mar. 10, 2021, total 13 pages.
(Continued)

*Primary Examiner* — Tat C Chio

(57) ABSTRACT

This application relate to the field of media technologies, and disclose an encoding method and apparatus, and a decoding method and apparatus, to improve flexibility of a probe data coding scheme. An example method includes: first obtaining probe data of a plurality of probes, and then dividing the probe data into a plurality of probe data groups; then, performing first encoding on a first probe data group in the plurality of probe data groups to generate a first encoding result, and performing second encoding on a second probe data group in the plurality of probe data groups to generate a second encoding result; and then, generating a bitstream based on the first encoding result and the second encoding result. An encoding scheme of the first encoding is different from an encoding scheme of the second encoding.

19 Claims, 12 Drawing Sheets

(51) Int. Cl.
*H04N 19/172* (2014.01)
*H04N 19/597* (2014.01)

(56) References Cited

U.S. PATENT DOCUMENTS

| | | | | |
|---|---|---|---|---|
| 2021/0012562 | A1 | 1/2021 | Mcguire et al. | |
| 2021/0056730 | A1* | 2/2021 | Ricard | G06T 9/00 |
| 2022/0028158 | A1 | 1/2022 | Stengel et al. | |
| 2022/0138988 | A1* | 5/2022 | Stengel | G06T 9/00 345/426 |
| 2025/0056041 | A1* | 2/2025 | Taquet | H04N 19/70 |

FOREIGN PATENT DOCUMENTS

| | | | |
|---|---|---|---|
| CN | 113785590 | A | 12/2021 |
| EP | 2636220 | B1 | 1/2018 |
| EP | 3306569 | A1 | 4/2018 |

OTHER PUBLICATIONS

Zina H. Cigolle et al:"A Survey of Efficient Representations for Independent Unit Vectors." Journal of Computer Graphics Techniques vol. 3, No. 2, Apr. 17, 2014, total 30 pages.
PCT International Search Report for PCT/CN2023/071501 dated Jan. 10, 2023, 8 pages.

* cited by examiner

ENCODING METHOD AND APPARATUS, AND DECODING METHOD AND APPARATUS

CROSS-REFERENCE TO RELATED APPLICATIONS

This application is a continuation of International Application No. PCT/CN2023/071501, filed on Jan. 10, 2023, which claims priority to Chinese Patent Application No. 202210254651.8, filed on Mar. 15, 2022. The disclosures of the aforementioned applications are hereby incorporated by reference in their entireties.

TECHNICAL FIELD

Embodiments of this application relate to the field of media technologies, and in particular, to an encoding method and apparatus, and a decoding method and apparatus.

BACKGROUND

With development of software and hardware technologies, people's pursuit for an image generated by a computer rendering system is increasingly high, and gradually changes from only direct illumination in the past to effect with more illumination and more real illumination. A probe is one of common methods for simulating illumination effect in the rendering system. During rendering, probe data can be used to affect illumination effect on an object in a rendered scene.

The probe data usually needs to be encoded into a bitstream during transmission. The conventional technology is mainly to first arrange probe data into a two-dimensional picture and then encode the probe data into a bitstream. Conventional probe data encoding schemes lack flexibility. Therefore, how to improve flexibility of the probe data encoding scheme is one of urgent problems to be resolved by a person skilled in the art.

SUMMARY

Embodiments of this application provide an encoding method and apparatus, and a decoding method and apparatus, to improve flexibility of a probe data coding scheme. To achieve the foregoing objectives, the following technical solutions are used in embodiments of this application.

According to a first aspect, an embodiment of this application provides an encoding method. The method includes: first obtaining probe data of a plurality of probes, and then dividing the probe data into a plurality of probe data groups; then, performing first encoding on a first probe data group in the plurality of probe data groups to generate a first encoding result, and performing second encoding on a second probe data group in the plurality of probe data groups to generate a second encoding result; and then, generating a bitstream based on the first encoding result and the second encoding result. An encoding scheme of the first encoding is different from an encoding scheme of the second encoding.

The conventional technology is mainly to first arrange probe data into a two-dimensional picture and then encode the probe data into a bitstream. A probe data encoding scheme lacks flexibility. However, in the encoding method provided in this embodiment of this application, in an encoding process, all obtained probe data is not encoded by using a same encoding scheme, but the probe data is first grouped, and obtained probe data is encoded based on a grouping result by using different encoding schemes. Compared with encoding all the obtained probe data by using the same encoding scheme, encoding the obtained probe data by using the different encoding schemes can improve flexibility of a probe data encoding scheme.

In a possible implementation, the obtaining probe data of a plurality of probes may include: obtaining probe data of a plurality of probes in a current frame.

It can be learned that in the encoding method provided in this embodiment of this application, in an encoding process, all probe data in the current frame is not encoded by using a same encoding scheme, but the probe data is first grouped, and the probe data in the current frame is encoded based on a grouping result by using different encoding schemes. Compared with encoding all the probe data in the current frame by using the same encoding scheme, encoding the probe data in the current frame by using the different encoding schemes can improve flexibility of a probe data encoding scheme.

In another possible implementation, the plurality of probe data groups include at least one probe data group including probe data in a current frame and probe data in a non-current frame, and the obtaining probe data of a plurality of probes may include: obtaining probe data of a plurality of probes in the current frame, and obtaining the probe data in the non-current frame.

It can be learned that in the encoding method provided in this embodiment of this application, in an encoding process, all obtained probe data including the probe data in the current frame and the probe data in the non-current frame is not encoded by using a same encoding scheme, but the probe data is first grouped, and the probe data group including the current frame and the non-current frame is encoded based on a grouping result by using different encoding schemes. Compared with encoding all the probe data by using the same encoding scheme, encoding the probe data group including the current frame and the non-current frame by using the different encoding schemes can improve flexibility of a probe data encoding scheme.

In a possible implementation, the first encoding may be intra encoding, and the second encoding may be inter encoding.

Compared with performing intra encoding on all obtained probe data, in the encoding method provided in this embodiment of this application, in an encoding process, intra encoding may be performed on a part of obtained probe data, and inter encoding may be performed on the other part of obtained probe data. This can reduce an amount of data for intra encoding, and further reduce a bit rate of a bitstream of the current frame.

In another possible implementation, for same data, rate-distortion curves of the first encoding and the second encoding are different, that is, distortion statuses of the first encoding and the second encoding at a same bit rate are different.

It may be understood that, in a case in which distortion of the first encoding is small at a high bit rate and distortion of the second encoding is small at a low bit rate, in the encoding method provided in this embodiment of this application, the first encoding with the small distortion at the high bit rate may be used for a part of probe data with high importance in the obtained probe data, and the second encoding with the small distortion at the low bit rate may be used for a part of probe data with low importance in the obtained probe data, so that, at a same bit rate, compared with encoding all the probe data in the current frame by using the same encoding scheme, encoding the probe data in the current frame by using the different encoding schemes achieves better client rendering effect.

In still another possible implementation, for same data, running time of the first encoding and running time of the second encoding are different.

In still another possible implementation, for same data, overheads of the first encoding and the second encoding are different. The overheads include but are not limited to memory usage, GPU memory usage, central processing unit (CPU) computing overheads, and graphics processing unit (GPU) computing overheads.

In a possible implementation, the dividing the probe data into a plurality of probe data groups may include: dividing the probe data into the plurality of probe data groups based on target information of the probe data.

It can be learned that in the encoding method provided in this embodiment of this application, the probe data may be grouped based on the target information of the probe data, and obtained probe data is encoded based on a grouping result by using different encoding schemes. Compared with encoding all the obtained probe data by using the same encoding scheme, encoding the obtained probe data by using the different encoding schemes can improve flexibility of a probe data encoding scheme.

In a possible implementation, for probe data of a same probe in different frames, same target information may exist, that is, target information of the probe data of the same probe in the different frames may be the same.

In another possible implementation, for probe data of a same probe in different frames, target information in a corresponding frame may also exist, that is, for each piece of probe data in the probe data of the same probe in the different frames, one piece of target information may exist independently. Correspondingly, the probe data of the same probe needs to be grouped based on target information of the probe in different frames during grouping.

For example, probe data 1 and target information 1 (namely, target information of the probe data 1) of the probe A exist in a frame 1, and probe data 2 and target information 2 (namely, target information of the probe data 2) of the probe A exist in a frame 2. The probe data 1 needs to be grouped based on the target information 1 during grouping, and the probe data 2 needs to be grouped based on the probe data 2 during grouping.

It can be learned that, although both the probe data 1 and the probe data 2 are grouped based on the target information of the probe A during grouping, target information of the probe A in different frames is used.

In addition, when the probe data includes probe data of a same probe in different frames, the probe data of the probe in the different frames may be divided into one group, or may not be divided into one group. This is not limited in this application.

In another possible implementation, the dividing the probe data into a plurality of probe data groups may include: randomly dividing the probe data into the plurality of probe data groups.

It can be learned that in the encoding method provided in this embodiment of this application, the probe data may be first randomly grouped, and obtained probe data is encoded based on a grouping result by using different encoding schemes. Compared with encoding all the obtained probe data by using a same encoding scheme, encoding the obtained probe data by using the different encoding schemes can improve flexibility of a probe data encoding scheme.

Optionally, the target information may include a diffuse reflection coefficient.

In a possible implementation, the dividing the probe data into the plurality of probe data groups based on target information of the probe data may include: dividing illumination data in the probe data into a plurality of probe data groups based on the diffuse reflection coefficient of the probe data of the plurality of probes.

It can be learned that in the encoding method provided in this embodiment of this application, the illumination data in the probe data may be grouped based on the diffuse reflection coefficient of the probe data of the probe, and obtained probe data is encoded based on a grouping result by using different encoding schemes. Compared with encoding all the obtained probe data by using a same encoding scheme, encoding the obtained probe data by using the different encoding schemes can improve flexibility of a probe data encoding scheme.

In a possible implementation, the dividing illumination data in the probe data into a plurality of probe data groups based on the diffuse reflection coefficient of the probe data of the plurality of probes may include: determining a first difference between each probe and at least one first target probe of the probe based on a diffuse reflection coefficient of probe data of the probe in the plurality of probes and a diffuse reflection coefficient of probe data of the at least one first target probe of the probe, and dividing the illumination data in the probe data into the plurality of probe data groups based on the first difference. The first target probe of each probe is a probe whose distance from a position of the probe is less than a first threshold.

It can be learned that in the encoding method provided in this embodiment of this application, a difference between probes may be calculated based on illumination data of the probes, then illumination data in the probe data is grouped based on the obtained difference, and obtained probe data is encoded based on a grouping result by using different encoding schemes. Compared with encoding all the obtained probe data by using a same encoding scheme, encoding the obtained probe data by using the different encoding schemes can improve flexibility of a probe data encoding scheme.

It should be noted that each probe and the probe itself are also first target probes of each other. For example, a probe A in a current frame and the probe A in a non-current frame are first target probes of each other.

In a possible implementation, the illumination data in the probe data may be divided into the plurality of probe data groups based on the first difference and according to a graph partitioning method. The first difference may be used as an edge weight.

In another possible implementation, the illumination data in the probe data may be divided into the plurality of probe data groups based on the first difference and according to a clustering algorithm. The clustering algorithm includes but is not limited to K-means.

In a possible implementation, the first difference may be a peak signal to noise ratio (PSNR) or a mean squared error (MSE).

It should be noted that the first threshold may be greater than a distance between two probes that are farthest from each other in the plurality of probes, so that any two probes in the plurality of probes are first target probes of each other.

Optionally, the target information may include distance data.

In a possible implementation, the dividing the probe data into the plurality of probe data groups based on target information of the probe data may include: dividing visibility data in the probe data into a plurality of probe data groups based on the distance data of the probe data of the plurality of probes.

In a possible implementation, the dividing visibility data in the probe data into a plurality of probe data groups based on the distance data of the probe data of the plurality of probes may include: determining a second difference between each probe and at least one second target probe of the probe based on distance data of probe data of the probe in the plurality of probes and distance data of probe data of the at least one second target probe of the probe, and dividing the visibility data in the probe data into the plurality of probe data groups based on the second difference. The second target probe of each probe is a probe whose distance from a position of the probe is less than a second threshold.

It can be learned that in the encoding method provided in this embodiment of this application, the visibility data in the probe data may be grouped based on the distance data of the probe data of the probe, and obtained probe data is encoded based on a grouping result by using different encoding schemes. Compared with encoding all the obtained probe data by using a same encoding scheme, encoding the obtained probe data by using the different encoding schemes can improve flexibility of a probe data encoding scheme.

It should be noted that each probe and the probe itself are also second target probes of each other. For example, a probe B in a current frame and the probe B in a non-current frame are second target probes of each other.

In a possible implementation, the visibility data in the probe data may be divided into the plurality of probe data groups based on the second difference and according to the graph partitioning method. The second difference may be used as an edge weight.

In another possible implementation, the visibility data in the probe data may be divided into the plurality of probe data groups based on the second difference and according to the clustering algorithm. The clustering algorithm includes but is not limited to K-means.

In a possible implementation, the second difference may be a PSNR or an MSE.

It should be noted that the second threshold may be greater than a distance between two probes that are farthest from each other in the plurality of probes, so that any two probes in the plurality of probes are second target probes of each other.

Optionally, the visibility data may include at least one of the following: distance data, square data of a distance, or variance data of distances.

Optionally, the target information may also include other information, for example, a color, a material, a normal direction, and texture coordinates.

In a possible implementation, the dividing the probe data into the plurality of probe data groups based on target information of the probe data may include: dividing the probe data into the plurality of probe data groups based on the other information (such as colors, materials, normal directions, and texture coordinates) of the plurality of probes.

In a possible implementation, when the probe data includes probe data in N frames, the probe data in the N frames may be divided into N probe data groups.

Optionally, each of the N probe data groups includes 1/N of probe data in each frame.

For example, when the probe data includes probe data in two frames (a first frame and a second frame), the probe data may be divided into two groups (a first data group and a second data group). The first data group includes half of the probe data in the first frame and the second frame. The second data group includes the other half of the probe data in the first frame and the second frame.

In a possible implementation, the method may further include: arranging the probe data into a two-dimensional picture based on a grouping status of the probe data, where the two-dimensional picture includes a plurality of picture blocks, and the plurality of picture blocks one-to-one correspond to the plurality of probe data groups.

The performing first encoding on a first probe data group in the plurality of probe data groups to generate a first encoding result may include: performing the first encoding on a picture block that is in the two-dimensional picture and that corresponds to the first probe data group to generate the first encoding result.

The performing second encoding on a second probe data group in the plurality of probe data groups to generate a second encoding result may include: performing the second encoding on a picture block that is in the two-dimensional picture and that corresponds to the second probe data group to generate the second encoding result.

It can be learned that in the encoding method provided in this embodiment of this application, the probe data may be first grouped, then different groups of probe data are respectively arranged into different picture blocks of the two-dimensional picture, and then different picture blocks of the two-dimensional picture including the probe data are encoded by using different encoding schemes. Compared with encoding all obtained probe data by using a same encoding scheme, encoding the different picture blocks of the two-dimensional picture including the probe data by using the different encoding schemes can improve flexibility of a probe data encoding scheme.

In a possible implementation, the arranging the probe data into a two-dimensional picture based on a grouping status of the probe data may include: arranging the probe data into the two-dimensional picture in an order of a Hilbert curve or a pseudo Hilbert curve based on the grouping status of the probe data.

In a possible implementation, the probe data may alternatively be arranged into a three-dimensional picture based on a grouping status of the probe data.

In a possible implementation, the method may further include: arranging the plurality of probe data groups into a plurality of two-dimensional pictures, where the plurality of two-dimensional pictures one-to-one correspond to the plurality of probe data groups.

The performing first encoding on a first probe data group in the plurality of probe data groups to generate a first encoding result may include: performing the first encoding on a two-dimensional picture that is in the plurality of two-dimensional pictures and that corresponds to the first probe data group to generate the first encoding result.

The performing second encoding on a second probe data group in the plurality of probe data groups to generate a second encoding result may include: performing the second encoding on a two-dimensional picture that is in the plurality of two-dimensional pictures and that corresponds to the second probe data group to generate the second encoding result.

It can be learned that in the encoding method provided in this embodiment of this application, the probe data may be first grouped, then different groups of probe data are respectively arranged into different two-dimensional pictures, and then the two-dimensional pictures including different probe data are encoded by using different encoding schemes. Compared with encoding all obtained probe data by using a same encoding scheme, encoding the two-dimensional pictures including the different probe data by using the different encoding schemes can improve flexibility of a probe data encoding scheme.

In a possible implementation, the first probe data group is a probe data group that is in the plurality of probe data groups and that corresponds to a frame number of the current frame.

For example, probe data in each frame may be divided into nine groups. A first group of probe data in each frame is a first probe data group in a tenth frame, a $100^{th}$ frame, a $190^{th}$ frame, and . . . , and is a second probe data group in the remaining frames; a second group of probe data in each frame is a first probe data group in a $20^{th}$ frame, a $110^{th}$ frame, a $200^{th}$ frame, and . . . , and is a second probe data group in the remaining frames; a third group of probe data in each frame is a first probe data group in a $30^{th}$ frame, a $120^{th}$ frame, a $210^{th}$ frame, and . . . , and is a second probe data group in the remaining frames; and by analogy, a ninth group of probe data in each frame is a first probe data group in a $90^{th}$ frame, a $180^{th}$ frame, a $270^{th}$ frame, and . . . , and is a second probe data group in the remaining frames.

It can be learned that in the encoding method provided in this embodiment of this application, the probe data may be first grouped to obtain the plurality of probe data groups, then first encoding is performed on the probe data group corresponding to the frame number of the current frame, and second encoding different from the first encoding is performed on other data groups. Compared with encoding all the probe data in the current frame by using the same encoding scheme, encoding different probe data by using different encoding schemes can improve flexibility of a probe data encoding scheme.

In a possible implementation, the method further includes: determining the first probe data based on preset information, where the preset information indicates a correspondence between a group and a frame number.

It can be learned that in the encoding method provided in this embodiment of this application, the probe data may be first grouped to obtain the plurality of probe data groups, then the first probe data is determined based on the preset information to perform first encoding on the probe data group corresponding to the frame number of the current frame, and second encoding different from the first encoding is performed on other data groups. Compared with encoding all the probe data in the current frame by using the same encoding scheme, encoding different probe data by using different encoding schemes can improve flexibility of a probe data encoding scheme.

Optionally, the bitstream may include grouping information, and the grouping information represents a grouping manner of the probe data.

It may be understood that the grouping information is encoded into the bitstream, which helps a decoder side obtain the grouping manner of the probe data based on the bitstream.

Optionally, the bitstream may include arrangement information, and the arrangement information represents arrangement information of the probe data.

Optionally, the arrangement information further indicates a correspondence between a picture block in a two-dimensional picture or a three-dimensional picture and a probe data group.

Optionally, the arrangement information further indicates a correspondence between a two-dimensional picture or a three-dimensional picture and a probe data group.

Optionally, the bitstream may include mapping information, and the mapping information indicates a correspondence between a picture block in a two-dimensional picture or a three-dimensional picture and a probe data group.

Optionally, the mapping information further indicates a correspondence between a two-dimensional picture or a three-dimensional picture and a probe data group.

Optionally, the bitstream may include encoding information, and the encoding information represents an encoding scheme of the plurality of probe data groups.

It may be understood that the encoding information is encoded into the bitstream, which helps the decoder side obtain a probe data encoding scheme based on the bitstream and decode the bitstream according to a corresponding decoding method to obtain probe data.

Optionally, the probe data may include ambient environment data, and the ambient environment data includes at least one of the following: the illumination data, the visibility data, a color, a material, a normal direction, or texture coordinates.

According to a second aspect, an embodiment of this application further provides a decoding method. The method includes: obtaining a bitstream, where the bitstream includes a plurality of pieces of probe data, and the plurality of pieces of probe data belong to a plurality of probe data groups; performing first decoding on a first probe data group in the plurality of probe data groups to generate a first decoding result; performing second decoding on a second probe data group in the plurality of probe data groups to generate a second decoding result, where a decoding scheme of the first decoding is different from a decoding scheme of the second decoding; obtaining probe data of a plurality of probes based on the first decoding result and the second decoding result; and performing rendering based on the probe data.

It can be learned that in the decoding method provided in this embodiment of this application, in a decoding process, all probe data in a current frame is not decoded by using a same decoding scheme, but probe data in the current frame in different probe data groups is decoded by using different decoding schemes. Compared with decoding all the probe data in the current frame by using the same decoding scheme, decoding the probe data in the current frame in the different probe data groups by using the different decoding schemes can improve flexibility of a probe data decoding scheme.

In a possible implementation, the method further includes: obtaining grouping information, where the grouping information represents a grouping manner of the plurality of pieces of probe data; and grouping the plurality of pieces of probe data in the bitstream based on the grouping information to obtain the plurality of probe data groups.

It can be learned that in the decoding method provided in this embodiment of this application, the grouping information may be obtained, and the plurality of pieces of probe data in the bitstream may be grouped based on the grouping information to obtain the plurality of probe data groups; and then, the probe data in different probe data groups is decoded by using different decoding schemes. Compared with decoding all the probe data in the current frame by using the same decoding scheme, decoding the probe data in the current frame in the different probe data groups by using the different decoding schemes can improve flexibility of a probe data decoding scheme.

In a possible implementation, the obtaining grouping information may include: determining the grouping information based on the bitstream.

It can be learned that in the decoding method provided in this embodiment of this application, the grouping information may be obtained based on the bitstream, and the plurality of pieces of probe data in the bitstream may be grouped based on the grouping information to obtain the plurality of probe data groups; then, the probe data in different probe data groups is decoded by using different decoding schemes. Compared with decoding all the probe data in the current frame by using the same decoding scheme, decoding the probe data in the current frame in the different probe data groups by using the different decoding schemes can improve flexibility of a probe data decoding scheme.

In a possible implementation, the method may further include: obtaining decoding information, where the decoding information represents a decoding scheme of the plurality of probe data groups, and the decoding scheme includes the decoding scheme corresponding to the first decoding and the decoding scheme corresponding to the second decoding.

It can be learned that in the decoding method provided in this embodiment of this application, the decoding information may be obtained, and the probe data in different probe data groups in the bitstream may be decoded based on the decoding information by using different decoding schemes. Compared with decoding all the probe data in the current frame by using the same decoding scheme, decoding the probe data in the current frame in the different probe data groups by using the different decoding schemes can improve flexibility of a probe data decoding scheme.

In a possible implementation, the obtaining decoding information may include: determining the decoding information based on the bitstream.

It can be learned that in the decoding method provided in this embodiment of this application, the decoding information may be obtained based on the bitstream, and the probe data in different probe data groups in the bitstream may be decoded based on the decoding information by using different decoding schemes. Compared with decoding all the probe data in the current frame by using the same decoding scheme, decoding the probe data in the current frame in the different probe data groups by using the different decoding schemes can improve flexibility of a probe data decoding scheme.

In a possible implementation, the method may further include: obtaining arrangement information, where the arrangement information represents an arrangement manner of the plurality of pieces of probe data.

It may be understood that, after the arrangement information is obtained, the probe data may be restored, based on the arrangement information, to an arrangement manner before encoding, and a position of the probe data in a two-dimensional picture may be searched for based on the arrangement information during rendering.

In a possible implementation, the obtaining arrangement information may include: determining the arrangement information based on the bitstream.

It may be understood that, after the arrangement information is determined based on the bitstream, the probe data may be restored, based on the arrangement information, to the arrangement manner before encoding, and the position of the probe data in the two-dimensional picture may be searched for based on the arrangement information during rendering.

In a possible implementation, the bitstream may include a two-dimensional picture, the two-dimensional picture includes a plurality of picture blocks, and the plurality of picture blocks one-to-one correspond to the plurality of probe data groups.

The performing first decoding on a first probe data group in the plurality of probe data groups to generate a first decoding result may include: performing the first decoding on a picture block that is in the two-dimensional picture and that corresponds to the first probe data group to generate the first decoding result.

The performing second decoding on a second probe data group in the plurality of probe data groups to generate a second decoding result may include: performing the second decoding on a picture block that is in the two-dimensional picture and that corresponds to the second probe data group to generate the second decoding result.

It can be learned that in the decoding method provided in this embodiment of this application, the decoding information may be obtained, and picture blocks including different probe data groups in the bitstream may be decoded based on the decoding information by using different decoding schemes. Compared with decoding all the probe data in the current frame by using the same decoding scheme, decoding the picture blocks, including the different probe data groups, in the current frame by using the different decoding schemes can improve flexibility of a probe data decoding scheme.

According to a third aspect, an embodiment of this application further provides an encoding apparatus. The apparatus includes an obtaining unit, a grouping unit, and an encoding unit. The obtaining unit is configured to obtain probe data of a plurality of probes. The grouping unit is configured to divide the probe data into a plurality of probe data groups. The encoding unit is configured to: perform first encoding on a first probe data group in the plurality of probe data groups to generate a first encoding result, perform second encoding on a second probe data group in the plurality of probe data groups to generate a second encoding result, and generate a bitstream based on the first encoding result and the second encoding result. An encoding scheme of the first encoding is different from an encoding scheme of the second encoding.

In a possible implementation, the obtaining unit is configured to obtain probe data of a plurality of probes in a current frame.

In another possible implementation, the plurality of probe data groups include at least one probe data group including probe data in a current frame and probe data in a non-current frame. The obtaining unit is configured to: obtain probe data of a plurality of probes in the current frame, and obtain the probe data in the non-current frame.

In a possible implementation, the grouping unit is configured to divide the probe data into the plurality of probe data groups based on target information of the probe data.

In a possible implementation, the target information includes a three-dimensional spatial position. The grouping unit is configured to divide the probe data into the plurality of probe data groups based on three-dimensional spatial positions of the plurality of probes.

In a possible implementation, the target information includes a diffuse reflection coefficient. The grouping unit is configured to divide illumination data in the probe data into a plurality of probe data groups based on the diffuse reflection coefficient of the probe data of the plurality of probes.

In a possible implementation, the grouping unit is configured to: determine a first difference between each probe and at least one first target probe of the probe based on a diffuse reflection coefficient of probe data of the probe in the plurality of probes and a diffuse reflection coefficient of probe data of the at least one first target probe of the probe, where the first target probe of each probe is a probe whose distance from a position of the probe is less than a first threshold; and divide the illumination data in the probe data into the plurality of probe data groups based on the first difference.

In a possible implementation, the target information includes distance data. The grouping unit is configured to divide visibility data in the probe data into a plurality of probe data groups based on the distance data of the probe data of the plurality of probes.

In a possible implementation, the grouping unit is configured to: determine a second difference between each probe and at least one second target probe of the probe based on distance data of probe data of the probe in the plurality of probes and distance data of probe data of the at least one second target probe of the probe, where the second target probe of each probe is a probe whose distance from a position of the probe is less than a second threshold; and divide the visibility data in the probe data into the plurality of probe data groups based on the second difference.

In a possible implementation, the apparatus further includes an arrangement unit. The arrangement unit is configured to arrange the probe data into a two-dimensional picture based on a grouping status of the probe data, where the two-dimensional picture includes a plurality of picture blocks, and the plurality of picture blocks one-to-one correspond to the plurality of probe data groups.

In a possible implementation, the encoding unit is configured to: perform the first encoding on a picture block that is in the two-dimensional picture and that corresponds to the first probe data group to generate the first encoding result, and perform the second encoding on a picture block that is in the two-dimensional picture and that corresponds to the second probe data group to generate the second encoding result.

In a possible implementation, the arrangement unit is configured to arrange the probe data into the two-dimensional picture in an order of a Hilbert curve or a pseudo Hilbert curve based on the grouping status of the probe data.

In a possible implementation, the apparatus further includes the arrangement unit. The arrangement unit is configured to arrange the plurality of probe data groups into a plurality of two-dimensional pictures, where the plurality of two-dimensional pictures one-to-one correspond to the plurality of probe data groups.

In a possible implementation, the encoding unit is configured to: perform the first encoding on a two-dimensional picture that is in the plurality of two-dimensional pictures and that corresponds to the first probe data group to generate the first encoding result, and perform the second encoding on a two-dimensional picture that is in the plurality of two-dimensional pictures and that corresponds to the second probe data group to generate the second encoding result.

In a possible implementation, the first probe data group is a first probe data group that is in the plurality of probe data groups and that corresponds to a frame number of the current frame.

In a possible implementation, the encoding unit is further configured to determine the first probe data based on preset information, where the preset information indicates a correspondence between a group and a frame number.

In a possible implementation, the bitstream includes grouping information, and the grouping information represents a grouping manner of the probe data.

In a possible implementation, the bitstream includes arrangement information, and the arrangement information represents arrangement information of the probe data.

In a possible implementation, the bitstream includes encoding information, and the encoding information represents an encoding scheme of the plurality of probe data groups.

In a possible implementation, the probe data includes ambient environment data, and the ambient environment data includes at least one of the following: the illumination data, the visibility data, a color, a material, a normal direction, or texture coordinates.

According to a fourth aspect, an embodiment of this application further provides a decoding apparatus. The apparatus includes an obtaining unit, a decoding unit, and a rendering unit. The obtaining unit is configured to obtain a bitstream, where the bitstream includes a plurality of pieces of probe data, and the plurality of pieces of probe data belong to a plurality of probe data groups. The decoding unit is configured to: perform first decoding on a first probe data group in the plurality of probe data groups to generate a first decoding result, perform second decoding on a second probe data group in the plurality of probe data groups to generate a second decoding result, and obtain probe data of a plurality of probes based on the first decoding result and the second decoding result, where a decoding scheme of the first decoding is different from a decoding scheme of the second decoding. The rendering unit is configured to perform rendering based on the probe data.

In a possible implementation, the obtaining unit is further configured to: obtain grouping information, where the grouping information represents a grouping manner of the plurality of pieces of probe data; and group the plurality of pieces of probe data in the bitstream based on the grouping information to obtain the plurality of probe data groups.

In a possible implementation, the obtaining unit is configured to determine the grouping information based on the bitstream.

In a possible implementation, the obtaining unit is further configured to obtain decoding information, where the decoding information represents a decoding scheme of the plurality of probe data groups, and the decoding scheme includes the decoding scheme corresponding to the first decoding and the decoding scheme corresponding to the second decoding.

In a possible implementation, the obtaining unit is configured to determine the decoding information based on the bitstream.

In a possible implementation, the obtaining unit is further configured to obtain arrangement information, where the arrangement information represents an arrangement manner of the plurality of pieces of probe data.

In a possible implementation, the obtaining unit is configured to determine the arrangement information based on the bitstream.

In a possible implementation, the bitstream includes a two-dimensional picture, the two-dimensional picture includes a plurality of picture blocks, and the plurality of picture blocks one-to-one correspond to the plurality of probe data groups. The decoding unit is configured to: perform the first decoding on a picture block that is in the two-dimensional picture and that corresponds to the first probe data group to generate the first decoding result, and perform the second decoding on a picture block that is in the two-dimensional picture and that corresponds to the second probe data group to generate the second decoding result.

In a possible implementation, the bitstream includes a plurality of two-dimensional pictures, and the plurality of two-dimensional pictures one-to-one correspond to the plurality of probe data groups. The decoding unit is configured to: perform the first decoding on a two-dimensional picture that is in the plurality of two-dimensional pictures and that corresponds to the first probe data group to generate the first decoding result, and perform the second decoding on a two-dimensional picture that is in the plurality of two-dimensional pictures and that corresponds to the second probe data group to generate the second decoding result.

According to a fifth aspect, an embodiment of this application further provides an encoding apparatus. The apparatus includes at least one processor. When the at least one processor executes program code or instructions, the method in any one of the first aspect or the possible implementations of the first aspect is implemented.

Optionally, the apparatus may further include at least one memory, and the at least one memory is configured to store the program code or the instructions.

According to a sixth aspect, an embodiment of this application further provides a decoding apparatus. The apparatus includes at least one processor. When the at least one processor executes program code or instructions, the method in any one of the second aspect or the possible implementations of the second aspect is implemented.

Optionally, the apparatus may further include at least one memory, and the at least one memory is configured to store the program code or the instructions.

According to a seventh aspect, an embodiment of this application further provides a chip, including an input interface, an output interface, and at least one processor. Optionally, the chip further includes a memory. The at least one processor is configured to execute code in the memory. When the at least one processor executes the code, the chip implements the method in any one of the first aspect or the possible implementations of the first aspect.

Optionally, the chip may be an integrated circuit.

According to an eighth aspect, an embodiment of this application further provides a computer-readable storage medium, configured to store a computer program. The computer program is configured to implement the method in any one of the first aspect or the possible implementations of the first aspect.

According to a ninth aspect, an embodiment of this application further provides a computer program product including instructions. When the computer program product runs on a computer, the computer is enabled to implement the method in any one of the first aspect or the possible implementations of the first aspect.

The encoding apparatus, the decoding apparatus, the computer storage medium, the computer program product, and the chip provided in embodiments are all configured to perform the encoding method and the decoding method provided above. Therefore, for beneficial effect that can be achieved by the encoding apparatus, the decoding apparatus, the computer storage medium, the computer program product, and the chip, refer to the beneficial effect of the encoding method and the decoding method provided above. Details are not described herein again.

BRIEF DESCRIPTION OF DRAWINGS

To describe technical solutions in embodiments of this application more clearly, the following briefly describes accompanying drawings for describing embodiments. It is clear that the accompanying drawings in the following descriptions show merely some of embodiments of this application, and a person of ordinary skill in the art may still derive other accompanying drawings from these accompanying drawings without creative efforts.

DESCRIPTION OF EMBODIMENTS

Figure 1A:
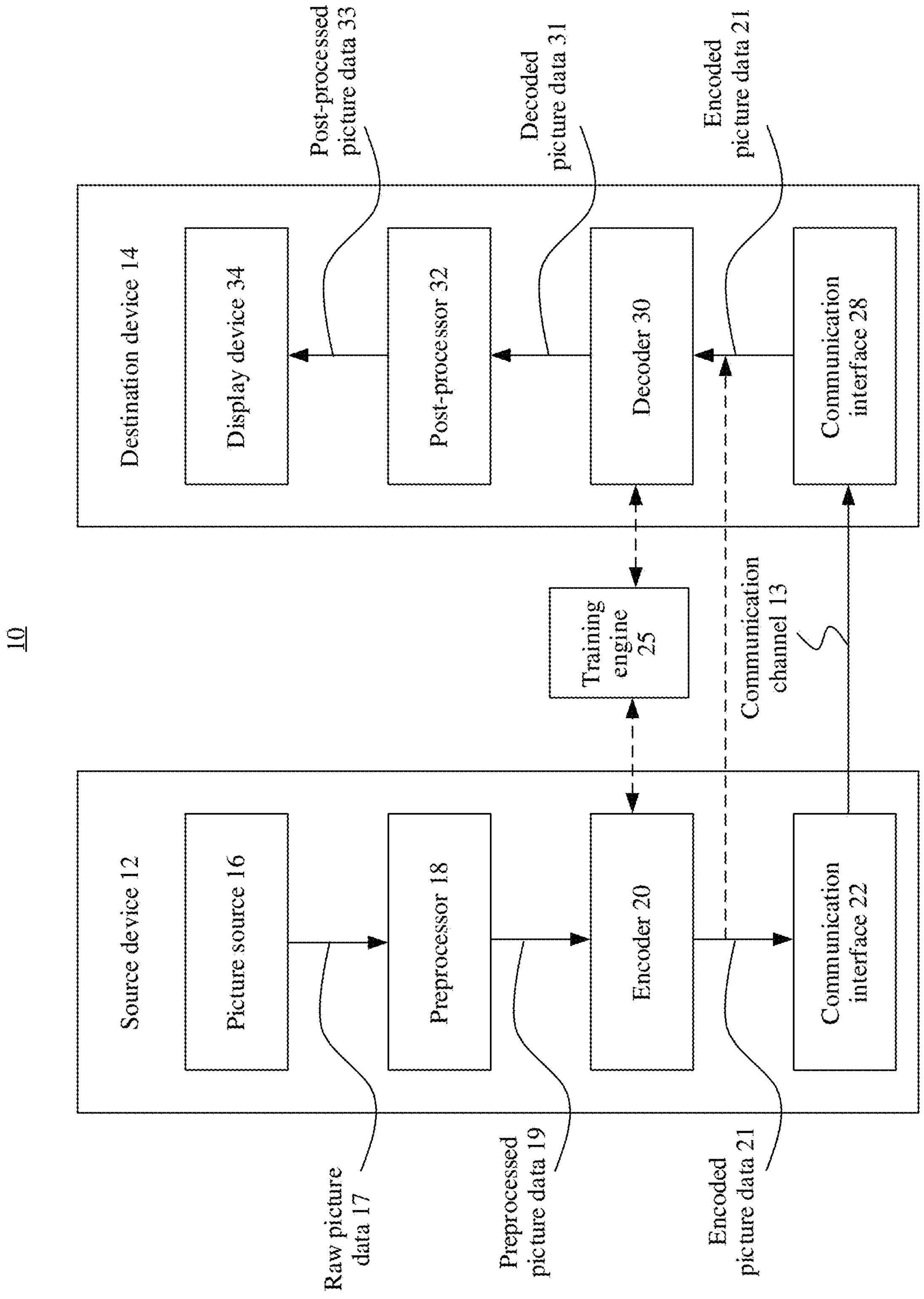
FIG. 1*a* is an example block diagram of a coding system according to an embodiment of this application.

The following clearly describes technical solutions of embodiments of this application with reference to accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of embodiments of this application.

The term "and/or" in this specification describes only an association relationship for describing associated objects and indicates that three relationships may exist. For example, A and/or B may indicate the following three cases: Only A exists, both A and B exist, and only B exists.

In this specification and the accompanying drawings of embodiments of this application, the terms "first", "second", and the like are intended to distinguish between different objects or distinguish between different processing of a same object, but do not indicate a particular order of the objects.

In addition, the terms "including", "having", and any other variants thereof mentioned in descriptions of embodiments of this application are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the product, or the device.

It should be noted that, in descriptions of embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Specifically, the word "example", "for example", or the like is used to present a related concept in a specific manner.

In descriptions of embodiments of this application, unless otherwise stated, "a plurality of" means two or more than two.

First, the terms in embodiments of this application are explained.

Reflection probe: The reflection probe is a typical light probe that records illumination data: a situation of probe-centered ambient illumination that is seen. Essentially, the data is data on a surface homeomorphic to a spherical surface, and may be spherical data or cube surface data. In an application scene, the reflection probe is placed in the center of a metal sphere and bound to a metal spherical surface. During rendering, an emergent angle is obtained through calculation according to an algorithm, and then a value corresponding to the emergent angle is extracted from data stored in the probe, to obtain an image that needs to be seen after reflection.

Dynamic diffuse reflection global illumination (DDGI): A probe volume including a plurality of probes is used. The probe volume is also referred to as a light field probe or an irradiance volume when being used to record the illumination. In addition, the probe volume is also used in technologies such as precomputed radiance transfer. In the DDGI, each probe, like a reflection probe, records illumination at all angles. In addition, each probe further records visibility data, that is, distribution data of distances between the probe and objects at all angles, that includes an average value of the distances corresponding to each angle and a variance of the distances. DDGI data is stored in the following manner: Data of a single probe is expanded into a square picture in an octahedron expansion manner, and pictures of a plurality of probes are arranged into a large picture. A column of redundant boundary data is added to the top, bottom, left, and right of a square picture of each probe, to facilitate texture interpolation in use.

Hilbert curve: The Hilbert curve is usually used to map high-dimensional data to one dimension or map one-dimensional data to a high dimension. The Hilbert curve has characteristics that data at adjacent positions in one dimension is also adjacent in a high dimension, and data at close positions in one dimension is also close in a high dimension, and has a characteristic of locality. Only data whose edge length is a power of 2 is supported.

Pseudo Hilbert curve: Similar to a Hilbert curve, the pseudo Hilbert curve has characteristics that data at close positions in one dimension is also close in a high dimension, and data at adjacent positions in one dimension is usually adjacent in a high dimension, but may not be adjacent at some positions. Data whose edge length is any positive integer is supported.

Data encoding and decoding include data encoding and data decoding. Data encoding is performed at a source side (or usually referred to as an encoder side), and usually includes processing (for example, compressing) raw data to reduce an amount of data required for representing the raw data (for more efficient storage and/or transmission). Data decoding is performed at a destination side (or usually referred to as a decoder side), and usually includes inverse processing relative to the encoder side to reconstruct raw data. "Encoding and decoding" of data in embodiments of this application should be understood as "encoding" or "decoding" of the data. A combination of an encoding part and a decoding part is also referred to as encoding and decoding (CODEC).

In a case of lossless data coding, the raw data can be reconstructed. In other words, reconstructed raw data has same quality as the raw data (assuming that no transmission loss or other data loss occurs during storage or transmission). In a case of lossy data coding, further compression is performed through, for example, quantization, to reduce an amount of data required for representing the raw data, and the raw data cannot be totally reconstructed at the decoder side. In other words, quality of reconstructed raw data is lower or worse than quality of the raw data.

Embodiments of this application may be applied to video data, other data having a compression/decompression requirement, and the like. The following describes embodiments of this application by using coding of the video data (which is briefly referred to as video coding) as an example. For other types of data (for example, picture data, audio data, integer data, and other data having a compression/decompression requirement), refer to the following descriptions. Details are not described in embodiments of this application. It should be noted that, compared with video coding, in a process of coding data such as the audio data and the integer data, the data does not need to be partitioned into blocks, but the data may be directly coded.

Video coding usually indicates processing of a sequence of pictures that form a video or a video sequence. In the field of video coding, the terms "picture", "frame", and "image" may be used as synonyms.

Several video coding standards are used for "lossy hybrid video coding" (that is, spatial and temporal prediction in a pixel domain is combined with 2D transform coding for applying quantization in a transform domain). Each picture of a video sequence is usually partitioned into a set of non-overlapping blocks, and coding is usually performed at a block level. In other words, at the encoder, a video is usually processed, that is, encoded, at a block (video block) level. For example, a prediction block is generated through spatial (intra picture) prediction and temporal (inter picture) prediction, the prediction block is subtracted from a current block (block being processed or to be processed) to obtain a residual block, and the residual block is transformed in the transform domain and quantized to reduce an amount of data that is to be transmitted (compressed). At the decoder side, inverse processing compared to the encoder is applied to an encoded block or a compressed block to reconstruct the current block for representation. Furthermore, the encoder duplicates the decoder processing step, so that the encoder and the decoder generate same prediction (for example, intra prediction and inter prediction) and/or pixel reconstruction, for processing, that is, coding, subsequent blocks.

In the following embodiments of a coding system 10, an encoder 20 and a decoder 30 are described based on FIG. 1*a* to FIG. 3.

FIG. 1*a* is an example block diagram of a coding system 10 according to an embodiment of this application, for example, a video coding system 10 (also referred to as a coding system 10 for short) that may use a technology in embodiments of this application. A video encoder 20 (also referred to as an encoder 20 for short) and a video decoder 30 (also referred to as a decoder 30 for short) of the video coding system 10 represent devices that may be configured to perform technologies in accordance various examples described in embodiments of this application.

As shown in FIG. 1*a*, the coding system 10 includes a source device 12 configured to provide encoded picture data 21 such as encoded pictures, to a destination device 14 for decoding the encoded picture data 21.

The source device 12 includes the encoder 20, and may additionally, that is, optionally, include a picture source 16, a preprocessor (or preprocessing unit) 18, for example, a picture preprocessor, and a communication interface (or communication unit) 22.

The picture source 16 may include or be any type of picture capturing device for capturing a real-world picture and the like, and/or any type of a picture generating device, for example a computer-graphics processor for generating a computer animated picture, or any type of a device for obtaining and/or providing a real-world picture, a computer generated picture (for example, screen content, a virtual reality (VR) picture) and/or any combination thereof (for example, an augmented reality (AR) picture). The picture source may be any type of memory or storage storing any of the foregoing pictures.

To distinguish processing performed by the preprocessor (or preprocessing unit) 18, a picture (or picture data) 17 may also be referred to as a raw picture (or raw picture data) 17.

The preprocessor 18 is configured to receive the raw picture data 17 and preprocess the raw picture data 17, to obtain a preprocessed picture (or preprocessed picture data) 19. The preprocessing performed by the preprocessor 18 may, for example, include trimming, color format conversion (for example, from RGB to YCbCr), color correction, or de-noising. It may be understood that the preprocessing unit 18 may be an optional component.

The video encoder (or encoder) 20 is configured to receive the preprocessed picture data 19 and provide the encoded picture data 21 (further descriptions are provided below, for example, based on FIG. 2).

A communication interface 22 of the source device 12 may be configured to receive the encoded picture data 21 and send the encoded picture data 21 (or any further processed version thereof) through a communication channel 13 to another device, for example, the destination device 14 or any other device, for storage or direct reconstruction.

The destination device 14 includes the decoder 30, and may additionally, that is, optionally, include a communication interface (or communication unit) 28, a post-processor (or post-processing unit) 32, and a display device 34.

The communication interface 28 of the destination device 14 is configured to directly receive the encoded picture data 21 (or any further processed version thereof) from the source device 12 or any other source device such as a storage device, and provide the encoded picture data 21 for the decoder 30. For example, the storage device is an encoded picture data storage device.

The communication interface 22 and the communication interface 28 may be configured to send or receive the encoded picture data (or encoded data) 21 via a direct communication link between the source device 12 and the destination device 14, for example, a direct wired or wireless connection, or via any type of network, for example, a wired or wireless network or any combination thereof, or any type of private network and public network, or any type of combination thereof.

The communication interface 22 may be, for example, configured to package the encoded picture data 21 into an appropriate format, for example, packets, and/or process the encoded picture data using any type of transmission encoding or processing for transmission via a communication link or communication network.

The communication interface 28, corresponding to the communication interface 22, may be, for example, configured to receive the transmitted data and process the transmitted data using any type of corresponding transmission decoding or processing and/or de-packaging to obtain the encoded picture data 21.

Both the communication interface 22 and the communication interface 28 may be configured as unidirectional communication interfaces as indicated by the arrow for the communication channel 13 in FIG. 1*a* pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide decoded picture data (or a decoded picture) 31 (further descriptions are provided below, for example, based on FIG. 3).

The post-processor 32 is configured to post-process the decoded picture data 31 (also referred to as reconstructed picture data), for example, the decoded picture, to obtain post-processed picture data 33, for example, a post-processed picture. Post-processing performed by the post-processing unit 32 may include, for example, color format conversion (for example, conversion from YCbCr to RGB), color correction, trimming, re-sampling, or any other processing for generating the decoded picture data 31 for display by, for example, the display device 34.

The display device 34 is configured to receive the post-processed picture data 33 for displaying the picture, for example, to a user or viewer. The display device 34 may be or include any type of display for representing the reconstructed picture, for example, an integrated or external display or monitor. For example, the display may include a liquid crystal display (LCD), an organic light emitting diode (OLED) display, a plasma display, a projector, a micro LED display, liquid crystal on silicon (LCoS) display, a digital light processor (DLP), or any type of other display.

The coding system 10 may further include a training engine 25. The training engine 25 is configured to train the encoder 20 (especially an entropy encoding unit 270 of the encoder 20) or the decoder 30 (especially an entropy decoding unit 304 of the decoder 30), to perform entropy encoding on a to-be-encoded picture block based on estimated probability distribution obtained through estimation. For detailed description of the training engine 25, refer to the following method embodiments.

Although FIG. 1*a* shows the source device 12 and the destination device 14 as separate devices, a device embodiment may alternatively include both the source device 12 and the destination device 14 or functions of both the source device 12 and the destination device 14, namely, the source device 12 or a corresponding function and the destination device 14 or a corresponding function. In these embodiments, the source device 12 or the corresponding function and the destination device 14 or the corresponding function may be implemented by using the same hardware and/or software or by separate hardware and/or software or any combination thereof.

As will be apparent for the skilled person based on the description, the existence and (exact) division into the different units or functions in the source device 12 and/or the destination device 14 as shown in FIG. 1*a* may vary depending on an actual device and application.

Figure 1B:
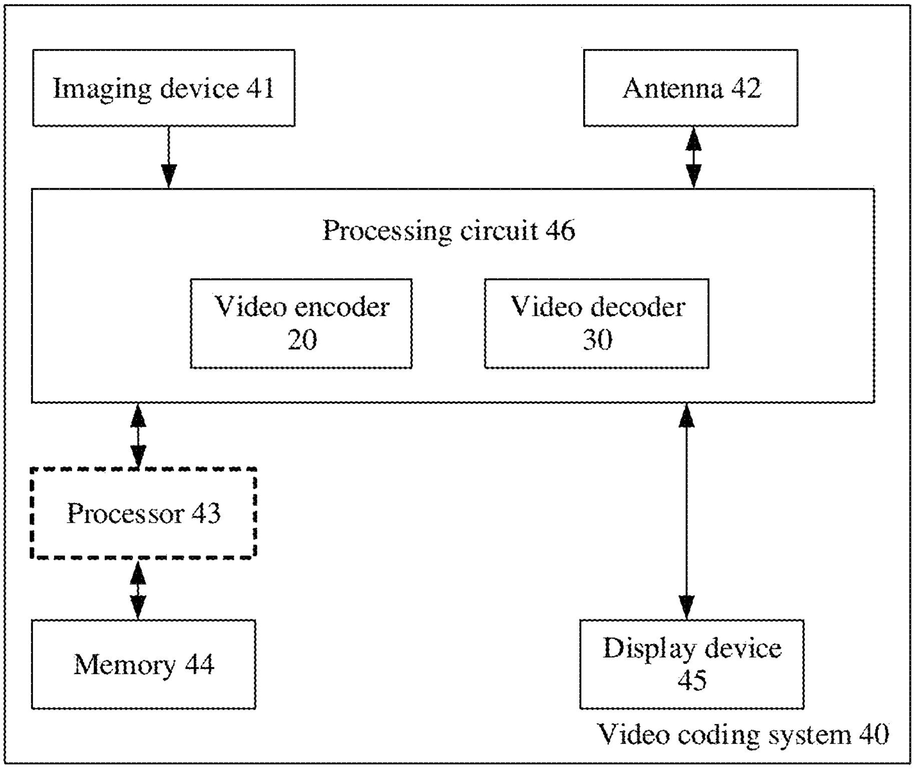
FIG. 1*b* is an example block diagram of a video coding system according to an embodiment of this application.
Figure 5:
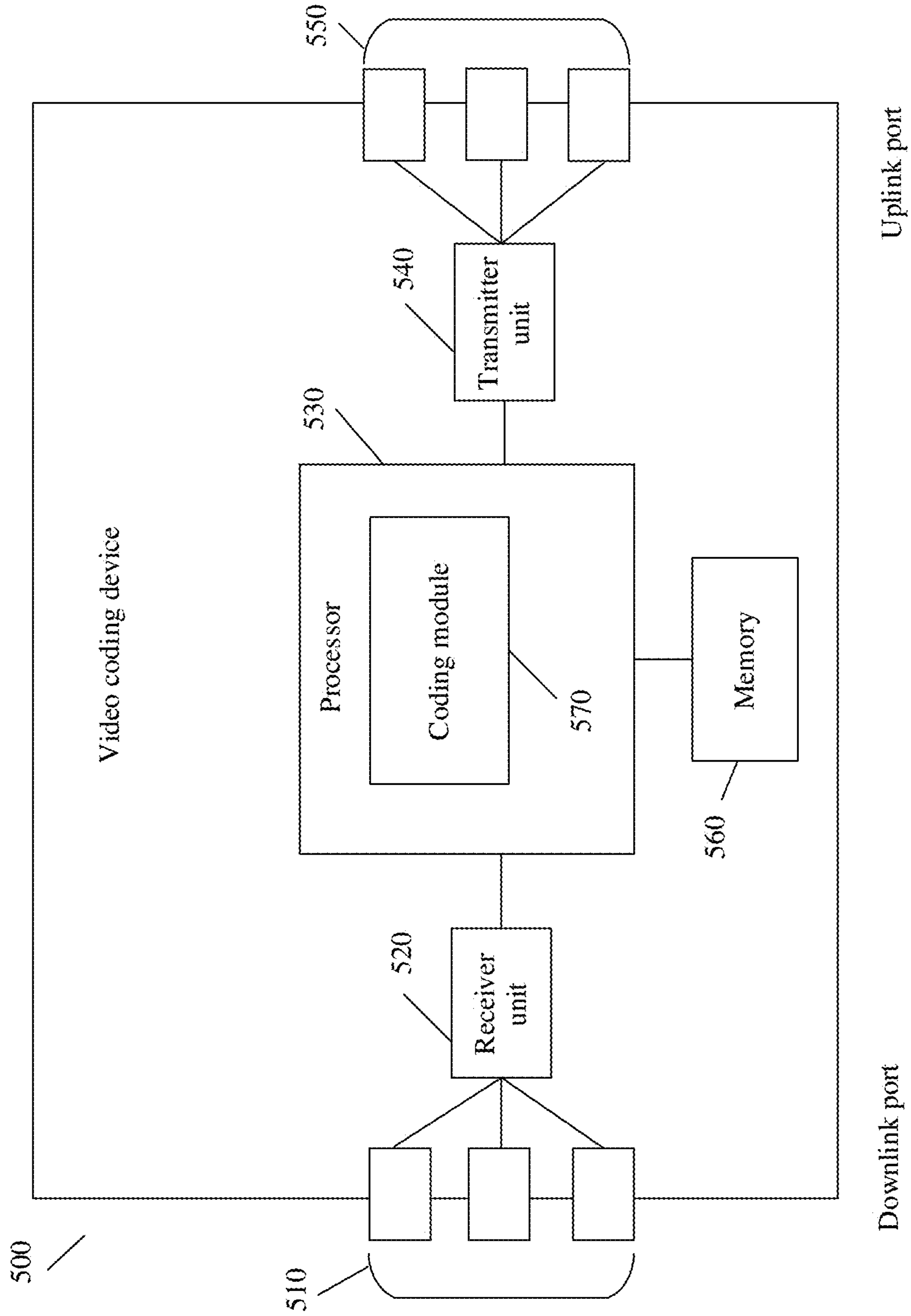
FIG. 5 is an example block diagram of a video coding device according to an embodiment of this application.

FIG. 1*b* is an example block diagram of a video coding system 40 according to an embodiment of this application. The encoder 20 (for example, the video encoder 20) or the decoder 30 (for example, the video decoder 30) or both the encoder 20 and the decoder 30 may be implemented by a processing circuit of the video coding system 40 shown in FIG. 1*b*, for example, one or more microprocessors, a digital signal processor (DSP), an application-specific integrated circuit (ASIC), a field-programmable gate array (FPGA), discrete logic, hardware, a video coding dedicated processor or any combination thereof. Refer to FIG. 2 and FIG. 3. FIG. 2 is an example block diagram of a video encoder according to an embodiment of this application, and FIG. 3 is an example block diagram of a video decoder according to an embodiment of this application. The encoder 20 may be implemented by the processing circuit 46 to embody various modules discussed with reference to the encoder 20 in FIG. 2 and/or any other encoder system or subsystem described in this specification. The decoder 30 may be implemented by the processing circuit 46 to embody various modules discussed with reference to the decoder 30 in FIG. 3 and/or any other decoder system or subsystem described in this specification. The processing circuit 46 may be configured to perform the various operations described below. As shown in FIG. 5, if the techniques are implemented partially in software, a device may store instructions for the software in a suitable non-transitory computer-readable storage medium and may execute the instructions in hardware using one or more processors to perform the techniques in embodiments of this application. Either of the video encoder 20 and the video decoder 30 may be integrated as a part of a combined encoder/decoder in a single device, for example, as shown in FIG. 1*b*.

The source device 12 and the destination device 14 may include any one of various devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content service servers or content delivery servers), a broadcast receiver device, a broadcast transmitter device, a monitor device, or the like and may use no or any type of operating system. The source device 12 and the destination device 14 may also be devices in a cloud computing scenario, for example, virtual machines in the cloud computing scenario. In some cases, the source device 12 and the destination device 14 may be equipped with components for wireless communication. Therefore, the source device 12 and the destination device 14 may be wireless communication devices.

A virtual scene application (APP), such as a VR application, an AR application, or a mixed reality (MR) application may be installed on each of the source device 12 and the destination device 14, and the VR application, the AR application, or the MR application may be run based on a user operation (for example, tapping, touching, sliding, shaking, or voice control). The source device 12 and the destination device 14 may capture pictures/videos of any object in an environment by using a camera and/or a sensor, and then display a virtual object on a display device based on the captured pictures/videos. The virtual object may be a virtual object (namely, an object in a virtual environment) in a VR scene, an AR scene, or an MR scene.

It should be noted that, in this embodiment of this application, the virtual scene applications in the source device 12 and the destination device 14 may be built-in applications of the source device 12 and the destination device 14, or may be applications that are provided by a third-party service provider and that are installed by a user. This is not specifically limited herein.

In addition, real-time video transmission applications, such as live broadcast applications, may be installed on the source device 12 and the destination device 14. The source device 12 and the destination device 14 may capture pictures/videos by using the camera, and then display the captured pictures/videos on the display device.

In some cases, the video coding system 10 shown in FIG. 1*a* is merely an example and the techniques provided in embodiments of this application are applicable to video coding settings (for example, video encoding or video decoding) that do not necessarily include any data communication between an encoding device and a decoding device. In other examples, data is retrieved from a local memory, sent through a network, or the like. A video encoding device may encode data and store encoded data into the memory, and/or a video decoding device may retrieve data from the memory and decode the data. In some examples, encoding and decoding are performed by devices that do not communicate with each other, but simply encode data into a memory and/or retrieve data from the memory and decode the data.

FIG. 1*b* is the example block diagram of the video coding system 40 according to this embodiment of this application. As shown in FIG. 1*b*, the video coding system 40 may include an imaging device 41, the video encoder 20, and the video decoder 30 (and/or a video encoder/decoder implemented by the processing circuit 46), an antenna 42, one or more processors 43, one or more memories 44, and/or a display device 45.

As shown in FIG. 1*b*, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include ASIC logic, a graphics processing unit, a general-purpose processor, or the like. The video coding system 40 may also include the optional processor 43. The optional processor 43 may similarly include ASIC logic, a graphics processing unit, a general-purpose processor, or the like. In addition, the memory 44 may be any type of memory, for example, a volatile memory (for example, a static random access memory (SRAM) or a dynamic random access memory (DRAM)) or a nonvolatile memory (for example, a flash memory). In a non-limitative example, the memory 44 may be implemented by a cache memory. In other examples, the processing circuit 46 may include a memory (for example, a cache) for implementing a picture buffer.

In some examples, the video encoder 20 implemented by the logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may be included in the video encoder 20 implemented by the processing circuit 46, to implement various modules discussed with reference to FIG. 2 and/or any other encoder system or subsystem described in this specification. The logic circuit may be configured to perform various operations described in this specification.

In some examples, the video decoder 30 may be implemented by the processing circuit 46 in a similar manner, to implement various modules discussed with reference to the video decoder 30 in FIG. 3 and/or any other decoder system or subsystem described in this specification. In some examples, the video decoder 30 implemented by the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may be included in the video decoder 30 implemented by the processing circuit 46, to implement various modules discussed with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame encoding described in this specification, for example, data related to encoding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

It should be understood that in this embodiment of this application, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may entropy-encode the syntax element into an encoded video bitstream. In such examples, the video decoder 30 may parse such syntax element and correspondingly decode the related video data.

For ease of description, embodiments of this application are described by referring to versatile video coding (VVC) reference software or high-efficiency video coding (HEVC) developed by the joint collaboration team on video coding (JCT-VC) of the ITU-T video coding experts group (VCEG) and the ISO/IEC motion picture experts group (MPEG). A person of ordinary skill in the art understands that embodiments of this application are not limited to the HEVC or the VVC.

Encoder and Encoding Method

Figure 2:
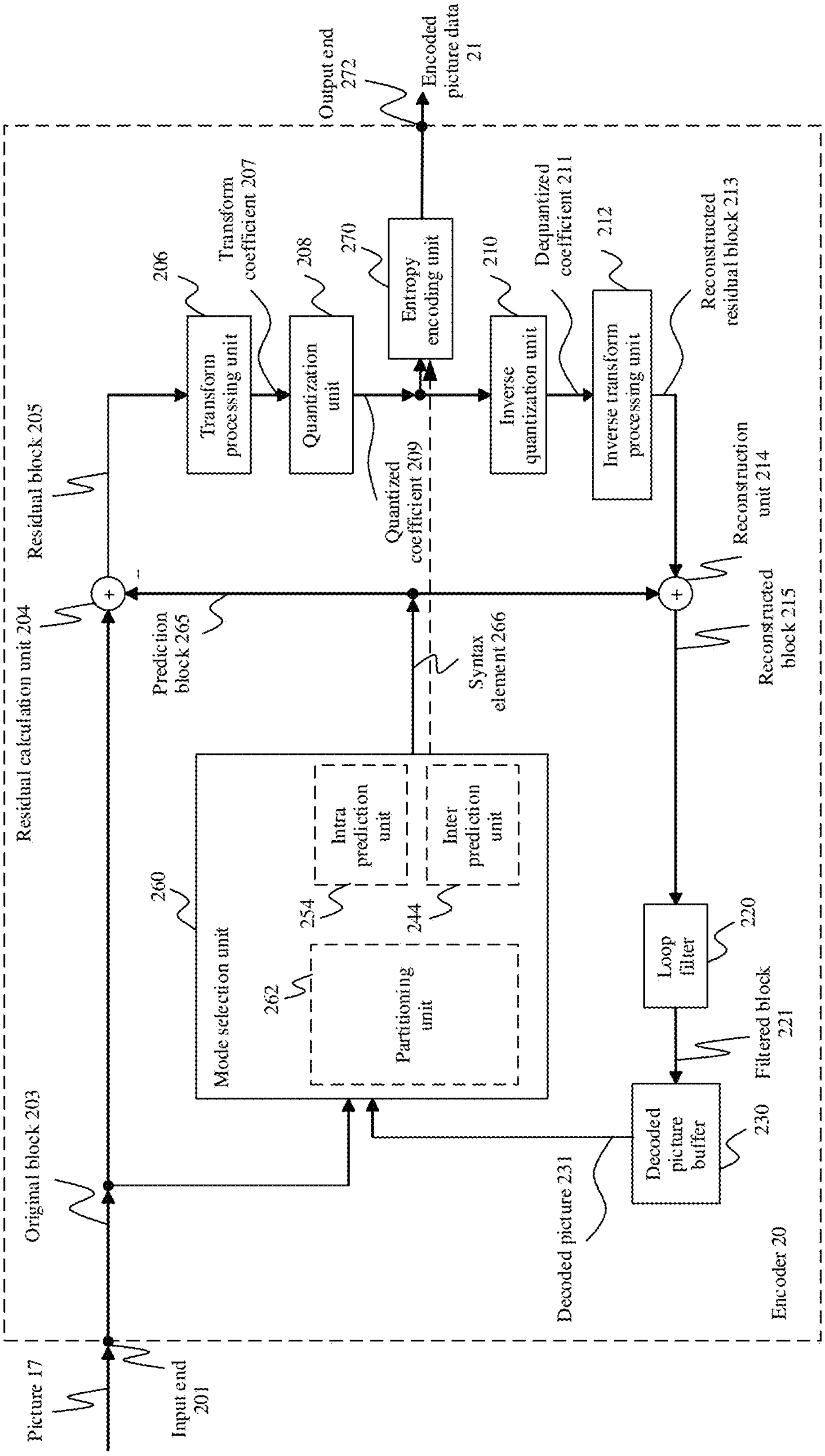
FIG. 2 is an example block diagram of a video encoder according to an embodiment of this application.

As shown in FIG. 2, the video encoder 20 includes an input end (or input interface) 201, a residual calculation unit 204, a transform processing unit 206, a quantization unit 208, an inverse quantization unit 210, and inverse transform processing unit 212, a reconstruction unit 214, a loop filter 220, a decoded picture buffer (DPB) 230, a mode selection unit 260, an entropy encoding unit 270, and an output end (or output interface) 272. The mode selection unit 260 may include an inter prediction unit 244, an intra prediction unit 254, and a partitioning unit 262. The inter prediction unit 244 may include a motion estimation unit and a motion compensation unit (not shown). The video encoder 20 shown in FIG. 2 may also be referred to as a hybrid video encoder or a video encoder based on a hybrid video codec.

Refer to FIG. 2. The inter prediction unit is a trained target model (also referred to as a neural network). The neural network is configured to process an input picture, a picture area, or a picture block, to generate a predictor of the input picture block. For example, a neural network for inter prediction is configured to receive the input picture, picture area, or picture block, and generate the predictor of the input picture, picture area, or picture block.

The residual calculation unit 204, the transform processing unit 206, the quantization unit 208, and the mode selection unit 260 form a forward signal path of the encoder 20, whereas the inverse quantization unit 210, the inverse transform processing unit 212, the reconstruction unit 214, a buffer 216, the loop filter 220, the DPB 230, the inter prediction unit 244, and the intra prediction unit 254 form a backward signal path of the encoder. The backward signal path of the encoder 20 corresponds to the signal path of the decoder (refer to the decoder 30 in FIG. 3). The inverse quantization unit 210, the inverse transform processing unit 212, the reconstruction unit 214, the loop filter 220, the decoded picture buffer 230, the inter prediction unit 244, and the intra prediction unit 254 further form a "built-in decoder" of the video encoder 20.

Picture and Picture Partitioning (Picture and Block)

The encoder 20 may be configured to receive, via an input end 201, a picture (or picture data) 17, for example, a picture in a sequence of pictures forming a video or video sequence. The received picture or picture data may also be a preprocessed picture (or preprocessed picture data) 19. For ease of simplicity, the picture 17 is used in the following descriptions. The picture 17 may also be referred to as a current picture or a to-be-encoded picture (in particular in video coding to distinguish the current picture from other pictures, for example, previously encoded and/or decoded pictures of a same video sequence, namely, a video sequence that also includes the current picture).

A (digital) picture is or may be considered as a two-dimensional array or matrix including samples with intensity values. A sample in the array may also be referred to as a pixel (pixel or pel, short form for a picture element). Quantities of samples in horizontal and vertical directions (or axes) of the array or picture define a size and/or resolution of the picture. For representation of colors, three color components are usually used, that is, the picture may be represented as or include three sample arrays. In an RBG format or color space, a picture includes corresponding red, green, and blue sample arrays. However, in video coding, each pixel is usually represented in a luminance/chrominance format or color space, for example, YCbCr, which includes a luminance component indicated by Y (sometimes indicated by L) and two chrominance components indicated by Cb and Cr. The luminance (luma) component Y represents luminance or gray level intensity (for example, both are the same in a gray-scale picture), and the two chrominance (chrominance, chroma for short) components Cb and Cr represent chrominance or color information components. Accordingly, a picture in a YCbCr format includes a luminance sample array of luminance sample values (Y), and two chrominance sample arrays of chrominance values (Cb and Cr). A picture in an RGB format may be converted or transformed into a picture in the YCbCr format and vice versa. The process is also referred to as color transform or conversion. If a picture is monochrome, the picture may include only a luminance sample array. Accordingly, a picture may be, for example, an array of luminance samples in a monochrome format or an array of luminance samples and two corresponding arrays of chrominance samples in 4:2:0, 4:2:2, and 4:4:4 color formats.

In an embodiment, an embodiment of the video encoder 20 may include a picture partitioning unit (not shown in FIG. 2) configured to partition the picture 17 into a plurality of (typically non-overlapping) picture blocks 203. These blocks may also be referred to as root blocks, macro blocks (H.264/AVC), coding tree blocks (CTBs), or coding tree units (CTUs) in the H.265/HEVC and VVC standards. The partitioning unit may be configured to use a same block size and a corresponding grid defining the block size for all pictures of a video sequence, or to change a block size between pictures or subsets or groups of pictures, and partition each picture into corresponding blocks.

In other embodiments, the video encoder may be configured to directly receive the block 203 of the picture 17, for example, one, several or all blocks forming the picture 17. The picture block 203 may also be referred to as a current picture block or a to-be-encoded picture block.

Same as the picture 17, the picture block 203 is also or may be considered as a two-dimensional array or matrix including samples with intensity values (sample values), provided that the two-dimensional array or matrix of the picture block 203 is smaller than that of the picture 17. In other words, the block 203 may include one sample array (for example, a luminance array in a case of a monochrome picture 17, or a luminance or chrominance array in a case of a color picture), three sample arrays (for example, one luminance array and two chrominance arrays in a case of a color picture 17), or any other quantity and/or type of arrays depending on a used color format. Quantities of samples in horizontal and vertical directions (or axes) of the block 203 define the size of the block 203. Accordingly, a block may be an M×N (M columns×N rows) array of samples, or an M×N array of transform coefficients.

In an embodiment, the video encoder 20 shown in FIG. 2 may be configured to encode the picture 17 block by block, for example, encoding and prediction are performed on each block 203.

In an embodiment, the video encoder 20 shown in FIG. 2 may be further configured to partition and/or encode the picture by using slices (also referred to as video slices), where the picture may be partitioned or encoded by using one or more slices (typically non-overlapping). Each slice may include one or more blocks (for example, CTUs) or one or more groups of blocks (for example, tiles in the H.265/HEVC/VVC standard and bricks in the VVC standard).

In an embodiment, the video encoder 20 shown in FIG. 2 may be further configured to partition and/or encode the picture by using slices/tile groups (also referred to as video tile groups) and/or tiles (also referred to as video tiles). The picture may be partitioned or encoded by using one or more slices/tile groups (typically non-overlapping), and each slice/tile group may include one or more blocks (for example, CTUs) or one or more tiles. Each tile may be of a rectangular shape or another shape, and may include one or more complete or fractional blocks (for example, CTUs).

Residual Calculation

The residual calculation unit 204 may be configured to calculate a residual block 205 based on the picture block (an original block) 203 and a prediction block 265 (further details about the prediction block 265 are provided later), for example, by subtracting sample values of the prediction block 265 from sample values of the picture block 203, sample by sample (e.g., pixel by pixel) to obtain the residual block 205 in a pixel domain.

Transform

The transform processing unit 206 is configured to apply a transform, for example, a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified in H.265/HEVC. Compared with an orthogonal DCT transform, such integer approximations are usually scaled by a factor. To preserve a norm of a residual block that is processed through forward transform and inverse transform, another scale factor is used as a part of a transform process. The scale factor is usually selected based on some constraints, for example, the scale factor being a power of two for a shift operation, a bit depth of the transform coefficient, and a tradeoff between accuracy and implementation costs. For example, a specific scale factor is specified for the inverse transform by, for example, the inverse transform processing unit 212 at the encoder 20 side (and a corresponding inverse transform by, for example, an inverse transform processing unit 312 at the decoder 30 side), and correspondingly, a corresponding scale factor may be specified for the forward transform by, for example, the transform processing unit 206 at the encoder 20 side.

In an embodiment, the video encoder 20 (correspondingly, the transform processing unit 206) may be configured to output transform parameters, for example, one or more transform types, for example, directly or after encoding or compressing performed by the entropy encoding unit 270, so that, for example, the video decoder 30 may receive and use the transform parameters for decoding.

Quantization

The quantization unit 208 may be configured to quantize the transform coefficients 207 to obtain quantized transform coefficients 209, for example, by applying scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for the scalar quantization, different proportions may be used to implement finer or coarser quantization. A smaller quantization step corresponds to finer quantization, and a larger quantization step corresponds to coarser quantization. An appropriate quantization step may be indicated by a QP. For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step), or vice versa. The quantization may include division by a quantization step and corresponding and/or inverse dequantization, for example, by the inverse quantization unit 210, may include multiplication by the quantization step. Embodiments according to some standards such as the HEVC may be configured to use the quantization parameter to determine the quantization step. Generally, the quantization step may be calculated based on the quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example implementation, a scale of the inverse transform may be combined with a scale of the dequantization. Alternatively, customized quantization tables may be used and signaled from an encoder to a decoder, for example, in a bitstream. The quantization is a lossy operation, where a larger quantization step indicates a larger loss.

In an embodiment, the video encoder 20 (correspondingly, the quantization unit 208) may be configured to output a QP, for example, directly or after encoding or compressing performed by the entropy encoding unit 270, so that, for example, the video decoder 30 may receive and use the quantization parameter for decoding.

Inverse Quantization

The inverse quantization unit 210 is configured to apply the inverse quantization of the quantization unit 208 on the quantized coefficients to obtain dequantized coefficients 211, for example, by applying an inverse scheme of the quantization scheme applied by the quantization unit 208 based on or using the same quantization step as the quantization unit 208. The dequantized coefficients 211 may also be referred to as dequantized residual coefficients 211 and corresponds to the transform coefficients 207. However, the dequantized coefficients 211 are typically not identical to the transform coefficients due to the loss caused by the quantization.

Inverse Transform

The inverse transform processing unit 212 is configured to apply the inverse transform of the transform applied by the transform processing unit 206, for example, an inverse DCT or an inverse DST, to obtain a reconstructed residual block 213 (or corresponding dequantized coefficients 213) in the pixel domain. The reconstructed residual block 213 may also be referred to as a transform block 213.

Reconstruction

The reconstruction unit 214 (for example, a summer 214) is configured to add the transform block 213 (namely, the reconstructed residual block 213) to the prediction block 265 to obtain a reconstructed block 215 in the pixel domain, for example, by adding sample values of the reconstructed residual block 213 and the sample values of the prediction block 265.

Filtering

The loop filter unit 220 (or "loop filter" 220 for short) is configured to filter the reconstructed block 215 to obtain a filtered block 221, or in general, to filter reconstructed samples to obtain filtered sample values. For example, the loop filter unit is configured to smooth pixel transitions or improve video quality. The loop filter unit 220 may include one or more loop filters such as a deblocking filter, a sample-adaptive offset (SAO) filter or one or more other filters, for example, an adaptive loop filter (ALF), a noise suppression filter (NSF), or any combination thereof. For example, the loop filter unit 220 may include a deblocking filter, a SAO filter, and an ALF filter. An order of a filtering process may be the deblocking filter, the SAO filter, and the ALF filter. For another example, a process called luminance mapping with chrominance scaling (LMCS) (namely, the adaptive in-loop reshaper) is added. This process is performed before deblocking. For another example, a deblocking filter process may also be applied to internal sub-block edges, for example, affine sub-block edges, ATMVP sub-block edges, sub-block transform (SBT) edges, and intra sub-partition (ISP) edges. Although the loop filter unit 220 is shown as the loop filter in FIG. 2, in another configuration, the loop filter unit 220 may be implemented as a post loop filter. The filtered block 221 may also be referred to as a filtered reconstructed block 221.

In an embodiment, the video encoder 20 (correspondingly, the loop filter unit 220) may be configured to output a loop filter parameter (such as a SAO filter parameter, an ALF filter parameter, or an LMCS parameter), for example, directly or after entropy encoding performed by the entropy encoding unit 270, so that, for example, the decoder 30 may receive and use a same loop filter parameter or different loop filter parameters for decoding.

Decoded Picture Buffer

The DPB 230 may be a reference picture memory that stores reference picture data for use in video data encoding by the video encoder 20. The DPB 230 may be formed by any one of a variety of memory devices, such as a DRAM, including a synchronous DRAM (SDRAM), a magnetoresistive RAM (MRAM), a resistive RAM (RRAM), or another type of storage device. The decoded picture buffer 230 may be configured to store one or more filtered blocks 221. The decoded picture buffer 230 may be further configured to store other previously filtered blocks, for example, previously reconstructed and filtered blocks 221, of a same current picture or different pictures such as previously reconstructed pictures, and may provide complete previously reconstructed, for example, decoded pictures (and corresponding reference blocks and samples) and/or a partially reconstructed current picture (and a corresponding reference block and sample), for example, for inter prediction. The decoded picture buffer 230 may be further configured to store one or more unfiltered reconstructed blocks 215, or generally store unfiltered reconstructed samples, for example, the reconstructed block 215 that is not filtered by the loop filter unit 220, or a reconstructed block or a reconstructed sample on which no any other processing is performed.

Mode Selection (Partitioning and Prediction)

The mode selection unit 260 includes the partitioning unit 262, the inter prediction unit 244, and the intra prediction unit 254, and is configured to receive or obtain raw picture data, for example, the original block 203 (the current block 203 of the current picture 17), and reconstructed picture data, for example, filtered and/or unfiltered reconstructed samples or blocks of the same (current) picture and/or from one or a plurality of previously decoded pictures, for example, from the decoded picture buffer 230 or other buffers (for example, a line buffer, not shown in FIG. 2). The reconstructed picture data is used as reference picture data for prediction, for example, inter prediction or intra prediction, to obtain the prediction block 265 or predictor 265.

The mode selection unit 260 may be configured to determine or select a partitioning manner for the current block (including non-partitioning) and a prediction mode (for example, an intra or inter prediction mode) and generate a corresponding prediction block 265, to calculate the residual block 205 and reconstruct the reconstructed block 215.

In an embodiment, the mode selection unit 260 may be configured to select partitioning and prediction modes (for example, from prediction modes supported by or available for the mode selection unit 260). The prediction mode provides best matching or a minimum residual (the minimum residual means better compression for transmission or storage), or minimum signaling overheads (the minimum signaling overheads mean better compression for transmission or storage), or considers or balances both the minimum residual and the minimum signaling overheads. The mode selection unit 260 may be configured to determine the partitioning and the prediction mode based on bit rate distortion optimization (RDO), for example, select a prediction mode that provides minimum bit rate distortion optimization. The terms “best”, “lowest”, “optimal” and the like in this specification do not necessarily mean “best”, “lowest”, “optimal” in general, but may also mean situations in which termination or selection criteria are met. For example, values that exceed or fall below a threshold or other restrictions may result in a “suboptimal selection” but reduce complexity and processing time.

In other words, the partitioning unit 262 may be configured to partition a picture from a video sequence into a sequence of CTUs, and the CTU 203 may be further partitioned into smaller block partitions or sub-blocks (which form the blocks again), for example, iteratively using quad-tree partitioning (QT), binary-tree partitioning (BT) or triple-tree partitioning (TT) or any combination thereof, and to perform, for example, prediction for each of the block partitions or sub-blocks, where the mode selection includes selection of a tree structure of the partitioned block 203 and prediction modes applied to each of the block partitions or sub-blocks.

The following describes in detail partitioning (for example, by the partitioning unit 262) and prediction processing (for example, by the inter prediction unit 244 and the intra prediction unit 254) that are performed by the video encoder 20.

Partitioning

The partitioning unit 262 may partition (or split) a picture block (or a CTU) 203 into smaller partitions, for example, square or rectangular smaller blocks. For a picture that has three sample arrays, one CTU includes an N×N block of luminance samples and two corresponding blocks of chrominance samples. A maximum allowed size of the luminance block in the CTU is specified to be 128×128 in the developing VVC standard, but may be specified to be a value different from 128×128 in the future, for example, 256×256. CTUs of a picture may be clustered/grouped as slices/tile groups, tiles, or bricks. One tile covers a rectangular area of one picture, and one tile may be divided into one or more bricks. One brick includes a plurality of CTU rows in one tile. A tile that is not partitioned into a plurality of bricks can be referred to as a brick. However, a brick is a true subset of a tile and is not referred to as a tile. The following two modes of tile groups are supported in the VVC: a raster-scan slice/tile group mode and a rectangular slice mode. In the raster-scan tile group mode, one slice/tile group includes a sequence of tiles in tile raster scan of one picture. In the rectangular slice mode, a slice includes a plurality of bricks of a picture that collectively form a rectangular area of the picture. The bricks in the rectangular slice are arranged in an order of brick raster scan of the slice. These smaller blocks (also be referred to as sub-blocks) may be further partitioned into even smaller partitions. This is also referred to as tree partitioning or hierarchical tree partitioning. A root block, for example, at a root tree level 0 (a hierarchy level 0 and a depth 0) may be recursively partitioned into two or more blocks at a next lower tree level, for example, nodes at a tree level 1 (a hierarchy level 1 and a depth 1). These blocks may be further partitioned into two or more blocks at a next lower level, for example, a tree level 2 (a hierarchy level 2 or a depth 2) and the like, until partitioning is terminated (because a termination criterion is met, for example, a maximum tree depth or a minimum block size is reached). Blocks that are not further partitioned are also referred to as leaf blocks or leaf nodes of a tree. A tree using partitioning into two partitions is referred to as a BT, a tree using partitioning into three partitions is referred to as a TT, and a tree using partitioning into four partitions is referred to as a QT.

For example, a coding tree unit (CTU) may be or include a CTB of luminance samples, two corresponding CTBs of chrominance samples of a picture that has three sample arrays, a CTB of samples of a monochrome picture or a picture that is coded by using three separate color planes and syntax structures (used to code the samples). Correspondingly, a coding tree block (CTB) may be an N×N block of samples for some values of N such that the division of a component into CTBs is partitioning. A coding unit (CU) may be or include a coding block of luminance samples, two corresponding coding blocks of chrominance samples of a picture that has three sample arrays, or a coding block of samples of a monochrome picture or a picture that is coded by using three separate color planes and syntax structures (used to code the samples). Correspondingly, a coding block (CB) may be an M×N block of samples for some values of M and N such that the division of a CTB into coding blocks is partitioning.

In embodiments, for example, according to the HEVC, a coding tree unit (CTU) may be split into a plurality of CUs by using a quad-tree structure denoted as a coding tree. Decision whether to code a picture area using inter (temporal) or intra (spatial) prediction is made at a leaf CU level. Each leaf CU can be further split into one, two or four PUs based on the PU splitting type. A same prediction process is used in one PU, and related information is transmitted to the decoder on a PU basis. After a residual block is obtained through the prediction process based on the PU splitting type, a leaf CU may be partitioned into transform units (TUs) based on another quad-tree structure similar to a coding tree for the CU.

In embodiments, for example, according to the latest video coding standard (referred to as versatile video coding (VVC)) currently in development, a combined quad-tree nested multi-type tree (for example, a binary tree and a ternary tree) is used to split a segmentation structure for partitioning a coding tree unit. In a coding tree structure in a coding tree unit, a CU may be square or rectangular. For example, the coding tree unit (CTU) is first partitioned using a quad-tree structure. Then leaf nodes of the quad-tree are further partitioned using a multi-type tree structure. There are four splitting types in the multi-type tree structure: vertical binary-tree splitting (SPLIT_BT_VER), horizontal binary-tree splitting (SPLIT_BT_HOR), vertical ternary-tree splitting (SPLIT_TT_VER), and horizontal ternary-tree splitting (SPLIT_TT_HOR). Leaf nodes of the multi-type tree are referred to as coding units (CUs). Such segmentation is used for prediction and transform processing without any other partitioning, unless the CU is excessively large for a maximum transform length. This means that, in most cases, the CU, the PU, and the TU have a same block size in the coding block structure of the quad-tree with the nested multi-type tree. An exception occurs when the maximum supported transform length is less than a width or a height of a color component of the CU. A unique signaling mechanism of partitioning or splitting information in the coding structure of the quad-tree with the nested multi-type tree is formulated in VVC. In the signaling mechanism, a coding tree unit (CTU) is treated as the root of a quad-tree and is first partitioned by a quad-tree structure. Each leaf node of the quad-tree (when being fully large) is then further partitioned using a multi-type tree structure. In the multi-type tree structure, a first flag (mtt_split_cu_flag) indicates whether the node is further partitioned; when the node is further partitioned, a second flag (mtt_split_cu_vertical_flag) indicates a splitting direction; and then a third flag (mtt_split_cu_binary_flag) indicates whether the splitting is binary tree splitting or ternary tree splitting. A multi-type tree splitting mode (MttSplitMode) of a CU can be derived by a decoder based on a predefined rule or a table and values of mtt_split_cu_vertical_flag and mtt_split_cu_binary_flag. It should be noted that, for a specific design, for example, a 64×64 luminance block and 32×32 chrominance pipeline design in VVC hardware decoders, TT splitting is not allowed when either a width or a height of a luminance coding block is greater than 64. TT splitting is also not allowed when either a width or height of a chrominance coding block is greater than 32. In the pipeline design, a picture is split into a plurality of virtual pipeline data units (VPDUs), and the VPDUs are defined as non-overlapping units in the picture. In hardware decoders, consecutive VPDUs are processed in a plurality of pipeline stages simultaneously. A VPDU size is roughly proportional to a buffer size in most pipeline stages. Therefore, a small VPDU size needs to be kept. In most hardware decoders, the VPDU size can be set to a maximum transform block (TB) size. However, in VVC, ternary tree (TT) and binary tree (BT) partitioning may lead to an increase in the VPDU size.

In addition, it should be noted that, when a portion of a tree node block exceeds a bottom or a right picture boundary, the tree node block is forced to be split until the all samples of every coded CU are located inside the picture boundaries.

For example, an intra sub-partition (ISP) tool may split a luminance intra prediction block vertically or horizontally into two or four sub-partitions based on a block size.

In an example, the mode selection unit 260 of the video encoder 20 may be configured to perform any combination of the partitioning techniques described above.

As described above, the video encoder 20 is configured to determine or select the best or an optimal prediction mode from a (pre-determined) prediction mode set. The prediction mode set may include, for example, an intra prediction mode and/or an inter prediction mode.

Intra Prediction

An intra prediction mode may include 35 different intra prediction modes, for example, non-directional modes such as a DC (or average value) mode and a planar mode, or directional modes such as those defined in HEVC, or may include 67 different intra prediction modes, for example, non-directional modes such as a DC (or average value) mode and a planar mode, or directional modes such as those defined in VVC. For example, several conventional angular intra prediction modes are adaptively replaced with wide-angle intra prediction modes for non-square blocks as defined in VVC. For another example, to avoid division operations for DC prediction, only a longer side is used to compute an average value for non-square blocks. In addition, results of intra prediction of the planar mode may be further modified by using a position dependent intra prediction combination (PDPC) method.

The intra prediction unit 254 is configured to use reconstructed samples of neighboring blocks of the same current picture to generate an intra prediction block 265 according to an intra prediction mode in the intra prediction mode set.

The intra prediction unit 254 (or usually the mode selection unit 260) is further configured to output intra prediction parameters (or usually information indicating the selected intra prediction mode for the block) to the entropy encoding unit 270 in a form of syntax elements 266 for inclusion into the encoded picture data 21, so that, for example, the video decoder 30 may receive and use the prediction parameters for decoding.

Intra prediction modes in HEVC include a direct current prediction mode, a planar prediction mode, and 33 angular prediction modes. That is, there are 35 candidate prediction modes in total. Pixels of reconstructed picture blocks on left and upper sides as references for intra prediction on a current block. A picture block that is in a surrounding area of the current block and that is used to perform intra prediction on the current block becomes a reference block, and a pixel in the reference block is referred to as a reference pixel. In the 35 candidate prediction modes, the direct current prediction mode is applicable to an area whose texture is flat in the current block, and an average value of reference pixels in the reference block is used as prediction for all pixels in the area. The planar prediction mode is applicable to a picture block whose texture changes smoothly. For the current block that meets the condition, bilinear interpolation is performed by using a reference pixel in a reference block as prediction of all pixels in the current block. In the angular prediction mode, a value of a reference pixel in a corresponding reference block is copied along an angle as prediction of all pixels in the current block by using a feature that texture of the current block is highly correlated with texture of a neighboring reconstructed picture block.

An HEVC encoder selects an optimal intra prediction mode from the 35 candidate prediction modes for the current block, and writes the optimal intra prediction mode into a video bitstream. To improve coding efficiency of intra prediction, the encoder/decoder derives three most probable modes from respective optimal intra prediction modes of reconstructed picture blocks that use intra prediction in the surrounding area. If the optimal intra prediction mode selected for the current block is one of the three most probable modes, a first index is encoded to indicate that the selected optimal intra prediction mode is one of the three most probable modes. If the selected optimal intra prediction mode is not one of the three most probable modes, a second index is encoded to indicate that the selected optimal intra prediction mode is one of the other 32 modes (modes other than the foregoing three most probable modes in the 35 candidate prediction modes). In the HEVC standard, 5-bit fixed-length code is used as the foregoing second index.

A method for deriving the three most probable modes by the HEVC encoder includes: selecting optimal intra prediction modes of the left neighboring picture block and the upper neighboring picture block of the current block, and putting the optimal intra prediction modes into a set; and if the two optimal intra prediction modes are the same, retaining only one intra prediction mode in the set. If the two optimal intra prediction modes are the same and both are angular prediction modes, two angular prediction modes adjacent to an angle direction are further selected and added to the set. Otherwise, the planar prediction mode, the direct current mode, and a vertical prediction mode are sequentially selected and added to the set until a quantity of modes in the set reaches 3.

After performing entropy decoding on the bitstream, the HEVC decoder obtains mode information of the current block. The mode information includes an identifier indicating whether the optimal intra prediction mode of the current block is in the three most probable modes, an index of the optimal intra prediction mode of the current block in the three most probable modes, or an index of the optimal intra prediction mode of the current block in the other 32 modes.

Inter Prediction

In a possible implementation, an inter prediction mode set depends on available reference pictures (that is, for example, at least some of previously decoded pictures stored in the DBP 230) and other inter prediction parameters, for example, depends on whether the entire reference picture or only a part, for example, a search window area near the area of the current block, of the reference picture is used for searching for a best matching reference block, and/or for example, depends on whether pixel interpolation is applied, for example, half-pixel, quarter-pixel and/or 1/16-pixel interpolation, or not.

In addition to the foregoing prediction modes, a skip mode and/or a direct mode may further be applied.

For example, a merge candidate list of an extended merge prediction mode includes the following five classes of candidates in order: spatial MVP from spatial neighboring CUs, temporal MVP from collocated CUs, history-based MVP from an FIFO table, pairwise average MVP, and zero MVs. Bilateral matching-based decoder side motion vector refinement (DMVR) may be used to increase accuracy of the MVs of the merge mode. A merge mode with MVD (MMVD) comes from a merge mode with motion vector differences. An MMVD flag is sent immediately after a skip flag and a merge flag are sent, to specify whether the MMVD mode is used for a CU. A CU-level adaptive motion vector resolution (AMVR) scheme may be used. An AMVR supports MVD of the CU to be coded at different precision. An MVD of a current CU may be adaptively selected based on a prediction mode of the current CU. When a CU is coded in the merge mode, a combined inter/intra prediction (CIIP) mode may be applied to the current CU. Weighted averaging of inter and intra prediction signals is performed to obtain CIIP prediction. For affine motion compensation prediction, an affine motion field of a block is described by using motion information of two control point (4-parameter) motion vectors or three control point (6-parameter) motion vectors. Sub-block-based temporal motion vector prediction (SbTMVP) is similar to temporal motion vector prediction (TMVP) in HEVC, but predicts a motion vector of a sub-CU in the current CU. A bi-directional optical flow (BDOF), previously referred to as BIO, is a simpler version that requires much less computation, especially in terms of a quantity of multiplications and a value of a multiplier. In a triangle partitioning mode, a CU is split evenly into two triangular partitions through diagonal splitting and anti-diagonal splitting. In addition, a bi-prediction mode is extended beyond simple averaging to support weighted averaging of two prediction signals.

The inter prediction unit 244 may include a motion estimation (ME) unit and a motion compensation (MC) unit (which are not shown in FIG. 2). The motion estimation unit may be configured to receive or obtain the picture block 203 (the current picture block 203 of the current picture 17) and a decoded picture 231, or at least one or more previously reconstructed blocks, for example, reconstructed blocks of one or more other/different previously decoded pictures 231, for motion estimation. For example, a video sequence may include the current picture and the previously decoded picture 231, or in other words, the current picture and the previously decoded picture 231 may be a part of or form a sequence of pictures forming the video sequence.

For example, the encoder 20 may be configured to select a reference block from a plurality of reference blocks of a same picture or different pictures of a plurality of other pictures and provide a reference picture (or a reference picture index) and/or an offset (spatial offset) between a position (x and y coordinates) of the reference block and a position of the current block as inter prediction parameters to the motion estimation unit. This offset is also referred to as a motion vector (MV).

The motion compensation unit is configured to obtain, for example, receive, an inter prediction parameter and to perform inter prediction based on or using the inter prediction parameter to obtain an inter prediction block 246. Motion compensation, performed by the motion compensation unit, may include extracting or generating a prediction block based on a motion/block vector determined through motion estimation, and may further include performing interpolation at sub-pixel precision. Interpolation filtering may be performed to generate a sample of another pixel from a sample of a known pixel, to potentially increase a quantity of candidate prediction blocks that may be used to encode a picture block. Upon receiving the motion vector for the PU of the current picture block, the motion compensation unit may locate the prediction block to which the motion vector points in one of the reference picture lists.

The motion compensation unit may further generate syntax elements associated with a block and a video slice for use by the video decoder 30 in decoding the picture blocks of the video slice. In addition or as an alternative to slices and corresponding syntax elements, tile groups and/or tiles and corresponding syntax elements may be generated or used.

Figure 4:
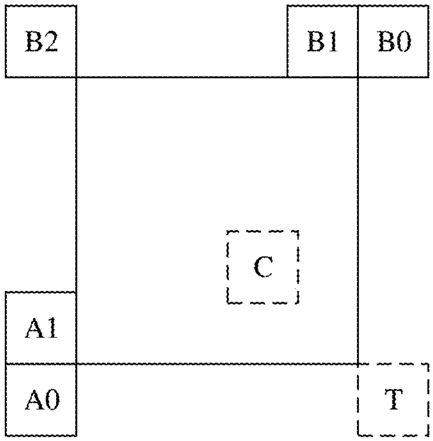
FIG. 4 is a diagram of an example of candidate picture blocks according to an embodiment of this application.

In a process of obtaining a candidate motion vector list in an advanced motion vector prediction (AMVP) mode, a motion vector (MV) that may be added to the candidate motion vector list as an alternative includes MVs of spatially neighboring and temporally neighboring picture blocks of the current block. The MV of the spatially neighboring picture block may include an MV of a left candidate picture block of the current block and an MV of an upper candidate picture block of the current block. For example, FIG. 4 is a diagram of an example of candidate picture blocks according to an embodiment of this application. As shown in FIG. 4, a set of left candidate picture blocks includes {A0, A1}, a set of upper candidate picture blocks includes {B0, B1, B2}, and a set of temporally neighboring candidate picture blocks includes {C, T}. All the three sets may be added to the candidate motion vector list as alternatives. However, according to an existing coding standard, a maximum length of the candidate motion vector list for AMVP is 2. Therefore, it is necessary to determine to add MVs of a maximum of two picture blocks to the candidate motion vector list from the three sets in a specified order. The order may be as follows: The set of left candidate picture blocks {A0, A1} of the current block is preferentially considered (where A0 is first considered, and A1 is then considered if A0 is unavailable); then the set of upper candidate picture blocks {B0, B1, B2} of the current block is considered (where B0 is first considered, B1 is then considered if B0 is unavailable, and B2 is then considered if B1 is unavailable); and finally, the set of temporally neighboring candidate picture blocks {C, T} of the current block is considered (where T is first considered, and C is then considered if T is unavailable).

After the candidate motion vector list is obtained, an optimal MV is determined from the candidate motion vector list based on a rate distortion cost (RD cost), and a candidate motion vector with a minimum RD cost is used as a motion vector predictor (MVP) of the current block. The rate distortion cost is calculated according to the following formula:

$$J=SAD+\lambda R$$

J represents the RD cost, SAD is a sum of absolute differences (SAD), obtained through motion estimation based on the candidate motion vector, between a pixel value of a prediction block and a pixel value of the current block, R represents a bit rate, and λ represents a Lagrange multiplier.

The encoder side transfers an index of the determined MVP in the candidate motion vector list to the decoder side. Further, motion search may be performed in an MVP-centered neighboring domain, to obtain an actual motion vector of the current block. The encoder side calculates a motion vector difference (MVD) between the MVP and the actual motion vector, and transfers the MVD to the decoder side. The decoder side parses an index, finds a corresponding MVP in the candidate motion vector list based on the index, parses the MVD, and adds the MVD and the MVP to obtain the actual motion vector of the current block.

In a process of obtaining a candidate motion information list in a merge mode, motion information that can be added to the candidate motion information list as an alternative includes motion information of the spatially neighboring picture block or temporally neighboring picture block of the current block. The spatially neighboring picture block and the temporally neighboring picture block may be shown in FIG. 4. Candidate motion information corresponding to spatially picture blocks in the candidate motion information list comes from five spatially neighboring blocks (A0, A1, B0, B1, and B2). If the spatially neighboring block is unavailable or is in an intra prediction mode, motion information of the spatially neighboring block is not added to the candidate motion information list. Temporally candidate motion information of the current block is obtained after an MV of a block at a corresponding position in a reference frame is scaled based on a picture order count (POC) of the reference frame and a picture order count of a current frame. Whether a block at a position T in the reference frame is available is first determined. If not available, a block at a position C is selected. After the candidate motion information list is obtained, optimal motion information is determined as motion information of the current block from the candidate motion information list based on the RD cost. The encoder side transmits an index value (denoted as a merge index) of a position of the optimal motion information in the candidate motion information list to the decoder side.

Entropy Encoding

The entropy encoding unit 270 is configured to apply an entropy encoding algorithm or scheme (for example, a variable length coding (VLC) scheme, a context-adaptive VLC (CAVLC) scheme, an arithmetic coding scheme, a binarization algorithm, a context-adaptive binary arithmetic coding (CABAC), syntax-based context-adaptive binary arithmetic coding (SBAC), probability interval partitioning entropy (PIPE) coding or another entropy encoding method or technology) to the quantized residual coefficients 209, inter prediction parameters, intra prediction parameters, loop filter parameters and/or other syntax elements to obtain encoded picture data 21 that can be output via an output end 272, for example, in a form of an encoded bitstream 21, so that the video decoder 30 and the like can receive and use the parameters for decoding. The encoded bitstream 21 may be transmitted to the video decoder 30, or stored in a memory for later transmission or retrieval by the video decoder 30.

Another structural variation of the video encoder 20 may be used to encode the video stream. For example, a non-transform-based encoder 20 may quantize a residual signal directly without the transform processing unit 206 for some blocks or frames. In another implementation, the encoder 20 may have the quantization unit 208 and the inverse quantization unit 210 combined into a single unit.

Decoder and Decoding Method

Figure 3:
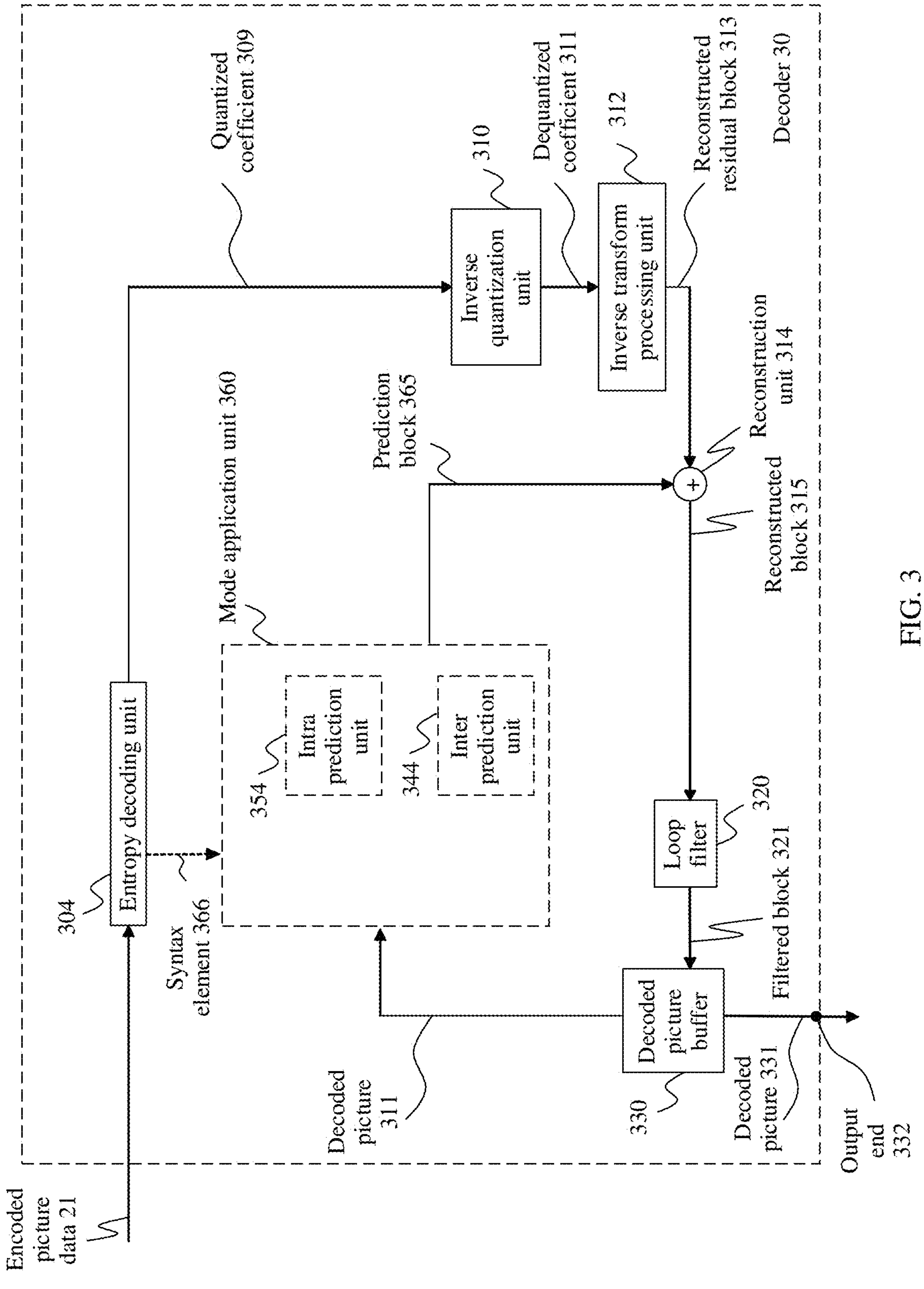
FIG. 3 is an example block diagram of a video decoder according to an embodiment of this application.

As shown in FIG. 3, the video decoder 30 is configured to receive encoded picture data 21 (for example, the encoded bitstream 21), for example, encoded by the encoder 20, to obtain a decoded picture 331. The encoded picture data or bitstream includes information for decoding the encoded picture data, for example, data that represents picture blocks of an encoded video slice (and/or tile groups or tiles), and associated syntax elements.

In the example of FIG. 3, the decoder 30 includes an entropy decoding unit 304, an inverse quantization unit 310, an inverse transform processing unit 312, a reconstruction unit 314 (for example, a summer 314), a loop filter 320, a decoded picture buffer (DBP) 330, a mode application unit 360, an inter prediction unit 344 and an intra prediction unit 354. The inter prediction unit 344 may be or include a motion compensation unit. In some examples, the video decoder 30 may perform a decoding process generally reciprocal to the encoding process described with reference to the video encoder 20 shown in FIG. 2.

As explained with regard to the encoder 20, the inverse quantization unit 210, the inverse transform processing unit 212, the reconstruction unit 214, the loop filter 220, the decoded picture buffer DPB 230, the inter prediction unit 344, and the intra prediction unit 354 further form a "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to the reconstruction unit 214, the loop filter 320 may be identical in function to the loop filter 220, and the decoded picture buffer 330 may be identical in function to the decoded picture buffer 230. Therefore, the explanations provided for corresponding units and functions of the video encoder 20 are correspondingly applicable to corresponding units and functions of the video decoder 30.

Entropy Decoding

The entropy decoding unit 304 is configured to parse the bitstream 21 (or usually the encoded picture data 21) and perform, for example, entropy decoding on the encoded picture data 21 to obtain quantized coefficients 309 and/or decoded coding parameters (not shown in FIG. 3), for example, any or all of inter prediction parameters (for example, a reference picture index and a motion vector), intra prediction parameters (for example, an intra prediction mode or an index), transform parameters, quantization parameters, loop filter parameters, and/or other syntax elements. The entropy decoding unit 304 may be configured to apply the decoding algorithm or scheme corresponding to the encoding scheme as described with regard to the entropy encoding unit 270 of the encoder 20. The entropy decoding unit 304 may be further configured to provide the inter prediction parameter, the intra prediction parameter, and/or another syntax element to the mode application unit 360, and provide another parameter to another unit of the decoder 30. The video decoder 30 may receive syntax elements at a video slice level and/or a video block level. In addition or as an alternative to slices and corresponding syntax elements, tile groups and/or tiles and corresponding syntax elements may be received or used.

Inverse Quantization

The inverse quantization unit 310 may be configured to receive quantization parameters (QPs) (or usually the information related to the inverse quantization) and quantized coefficients from the encoded picture data 21 (for example, by parsing and/or decoding by the entropy decoding unit 304) and perform, based on the quantization parameters, an inverse quantization on the decoded quantized coefficients 309 to obtain dequantized coefficients 311. The dequantized coefficients 311 may also be referred to as transform coefficients 311. An inverse quantization process may include use of a quantization parameter calculated by the video encoder 20 for each video block in the video slice to determine a degree of quantization, and likewise, a degree of inverse quantization that needs to be performed.

Inverse Transform

The inverse transform processing unit 312 may be configured to receive dequantized coefficients 311, also referred to as transform coefficients 311, and apply a transform to the dequantized coefficients 311 to obtain reconstructed residual blocks 313 in a pixel domain. The reconstructed residual block 313 may also be referred to as a transform block 313. The transform may be an inverse transform, for example, an inverse DCT, an inverse DST, an inverse integer transform, or a conceptually similar inverse transform process. The inverse transform processing unit 312 may be further configured to receive transform parameters or corresponding information from the encoded picture data 21 (for example, by parsing and/or decoding by the entropy decoding unit 304) to determine the transform to be applied to the dequantized coefficients 311.

Reconstruction

The reconstruction unit 314 (for example, the summer 314) is configured to add the reconstructed residual block 313 to the prediction block 365 to obtain a reconstructed block 315 in the pixel domain, for example, by adding the sample values of the reconstructed residual block 313 and the sample values of the prediction block 365.

Filtering

The loop filter unit 320 (either in a coding loop or after the coding loop) is configured to filter the reconstructed block 315 to obtain a filtered block 321, to smooth pixel transitions or improve video quality. The loop filter unit 320 may include one or more loop filters such as a deblocking filter, a sample-adaptive offset (SAO) filter or one or more other filters, for example, an adaptive loop filter (ALF), a noise suppression filter (NSF), or any combination thereof. For example, the loop filter unit 220 may include a deblocking filter, a SAO filter, and an ALF filter. An order of a filtering process may be the deblocking filter, the SAO filter, and the ALF filter. For another example, a process called luminance mapping with chrominance scaling (LMCS) (namely, the adaptive in-loop reshaper) is added. This process is performed before deblocking. For another example, a deblocking filter process may also be applied to internal sub-block edges, for example, affine sub-block edges, ATMVP sub-block edges, sub-block transform (SBT) edges, and intra sub-partition (ISP) edges. Although the loop filter unit 320 is shown as the loop filter in FIG. 3, in another configuration, the loop filter unit 320 may be implemented as a post loop filter.

Decoded Picture Buffer

Decoded video blocks 321 of a picture are then stored in the decoded picture buffer 330, and the decoded picture buffer 330 stores the decoded pictures 331 as reference pictures for subsequent motion compensation for other pictures and/or for output respectively display.

The decoder 30 is configured to output the decoded picture 331, for example, via an output end 332, for presentation to a user or viewing by a user.

Prediction

The inter prediction unit 344 may be identical in function to the inter prediction unit 244 (in particular to the motion compensation unit) and the intra prediction unit 354 may be identical in function to the intra prediction unit 254, and performs splitting or partitioning decisions and prediction based on the partitioning and/or prediction parameters or respective information received from the encoded picture data 21 (for example, by parsing and/or decoding by the entropy decoding unit 304). The mode application unit 360 may be configured to perform the prediction (intra or inter prediction) per block based on reconstructed pictures, blocks or respective samples (filtered or unfiltered) to obtain the prediction block 365.

When the video slice is coded as an intra coded slice (I slice), the intra prediction unit 354 of the mode application unit 360 is configured to generate the prediction block 365 for a picture block of the current video slice based on a signaled intra prediction mode and data from previously decoded blocks of the current picture. When the video picture is encoded as an inter coded (that is, B or P) slice, the inter prediction unit 344 (for example, the motion compensation unit) of the mode application unit 360 is configured to generate the prediction block 365 for a video block of the current video slice based on the motion vectors and other syntax elements received from the entropy decoding unit 304. For inter prediction, the prediction blocks may be generated from a reference picture in a reference picture list. The video decoder 30 may construct reference frame lists: a list 0 and a list 1, by using a default construction technology based on reference pictures stored in the DPB 330. The same or similar process may be applied for or by embodiments using tile groups (for example, video tile groups) and/or tiles (for example, video tiles) in addition or alternatively to slices (for example, video slices), for example, a video may be coded by using I, P or B tile groups and/or tiles.

The mode application unit 360 is configured to determine the prediction information for a video block of the current video slice by parsing the motion vectors or other syntax elements, and use the prediction information to generate the prediction block for the current video block being decoded. For example, the mode application unit 360 uses some of the received syntax elements to determine a prediction mode (for example, intra prediction or inter prediction) used to code the video blocks of the video slice, an inter prediction slice type (for example, a B slice, a P slice, or a GPB slice), construction information for one or more of the reference picture lists for the slice, motion vectors for each inter coded video block of the slice, an inter prediction status for each inter coded video block of the slice, and other information to decode the video blocks in the current video slice. The same or similar process may be applied for or by embodiments using tile groups (for example, video tile groups) and/or tiles (for example, video tiles) in addition or alternatively to slices (for example, video slices), for example, a video may be coded by using I, P or B tile groups and/or tiles.

In an embodiment, the video decoder 30 in FIG. 3 may be further configured to partition and/or decode a picture by using slices (also referred to as video slices), where the picture may be partitioned or decoded by using one or more slices (typically non-overlapping). Each slice may include one or more blocks (for example, CTUs) or one or more groups of blocks (for example, tiles in the H.265/HEVC/VVC standard and bricks in the VVC standard).

In an embodiment, the video decoder 30 shown in FIG. 3 may be further configured to partition and/or decode the picture by using slices/tile groups (also referred to as video tile groups) and/or tiles (also referred to as video tiles). The picture may be partitioned or decoded by using one or more slices/tile groups (typically non-overlapping), and each slice/tile group may include one or more blocks (for example, CTUs) or one or more tiles. Each tile may be of a rectangular shape or another shape, and may include one or more complete or fractional blocks (for example, CTUs).

Other variations of the video decoder 30 may be used to decode the encoded picture data 21. For example, the decoder 30 may generate an output video stream without the loop filter unit 320. For example, a non-transform-based decoder 30 may inversely quantize the residual signal directly without the inverse transform processing unit 312 for some blocks or frames. In another implementation, the video decoder 30 may have the inverse quantization unit 310 and the inverse transform processing unit 312 that are combined into a single unit.

It should be understood that, in the encoder 20 and the decoder 30, a processing result of a current step may be further processed and then output to a next step. For example, after interpolation filtering, motion vector derivation or loop filtering, a further operation, such as a clip or shift operation, may be performed on a processing result of the interpolation filtering, motion vector derivation, or loop filtering.

It should be noted that further operations may be performed on the derived motion vectors of a current block (including but not limit to control point motion vectors in an affine mode, sub-block motion vectors in affine, planar, and ATMVP modes, temporal motion vectors, and so on). For example, the value of the motion vector is constrained to a predefined range based on a representation bit of the motion vector. If the representation bit of the motion vector is bitDepth, the range is from −2^(bitDepth−1) to 2^(bitDepth−1)−1, where the "^" represents exponentiation. For example, if bitDepth is set to 16, the range is from −32768 to 32767, or if bitDepth is set to 18, the range is from −131072 to 131071. For example, the value of the derived motion vector (for example, the MVs of four 4×4 sub-blocks in one 8×8 block) is constrained such that a maximum difference between integer parts of the MVs of the four 4×4 sub-blocks does not exceed N pixels, for example, does not exceed one pixel. Two methods for constraining the motion vector based on the bitDepth are provided herein.

Although video coding is mainly described in the foregoing embodiments, it should be noted that the embodiments of the coding system 10, the encoder 20, and the decoder 30 and other embodiments described in this specification may also be used for still picture processing or coding, that is, processing or coding of a single picture independent of any preceding or consecutive pictures in video coding. In general, only the inter prediction units 244 (encoder) and 344 (decoder) may not be available in case the picture processing is limited to a single picture 17. All other functions (also referred to as tools or technologies) of the video encoder 20 and the video decoder 30 may also be used for still picture processing, for example, residual calculation 204/304, transform 206, quantization 208, inverse quantization 210/310, (inverse) transform 212/312, partitioning 262/362, intra prediction 254/354, and/or loop filtering 220/320, entropy encoding 270, and entropy decoding 304.

FIG. 5 is an example block diagram of a video coding device 500 according to an embodiment of this application. The video coding device 500 is applicable to implementing the disclosed embodiments described in this specification. In an embodiment, the video coding device 500 may be a decoder such as the video decoder 30 in FIG. 1*a*, or may be an encoder such as the video encoder 20 in FIG. 1*a*.

The video coding device 500 includes ingress ports 510 (or input ports 510) and a receiver unit (Rx) 520 for receiving data; a processor, a logic unit, or a central processing unit (CPU) 530 for processing the data, where for example, the processor 530 herein may be a neural network processing unit 530; a transmitter unit (Tx) 540 and egress ports 550 (or output ports 550) for transmitting the data; and a memory 560 for storing the data. The video coding device 500 may also include optical-to-electrical (OE) components and electrical-to-optical (EO) components coupled to the ingress ports 510, the receiver unit 520, the transmitter unit 540, and the egress ports 550 for egress or ingress of optical or electrical signals.

The processor 530 is implemented by hardware and software. The processor 530 may be implemented as one or more processor chips, cores (for example, multi-core processors), FPGAs, ASICs, and DSPs. The processor 530 communicates with the ingress ports 510, the receiver unit 520, the transmitter unit 540, the egress ports 550, and the memory 560. The processor 530 includes a coding module 570 (for example, a neural network-based coding module 570). The coding module 570 implements the embodiments disclosed above. For example, the coding module 570 performs, processes, prepares, or provides various coding operations. Therefore, the coding module 570 provides a substantial improvement to functions of the video coding device 500 and affects switching of the video coding device 500 to different states. Alternatively, the coding module 570 is implemented by using instructions stored in the memory 560 and executed by the processor 530.

The memory 560 may include one or more disks, tape drives, and solid-state drives and may be used as an overflow data storage device, and is configured to store programs when such programs are selected for execution, and store instructions and data that are read during program execution. The memory 560 may be volatile and/or nonvolatile and may be a read-only memory (ROM), a random access memory (RAM), a ternary content-addressable memory (TCAM), and/or a static random access memory (SRAM).

Figure 6:
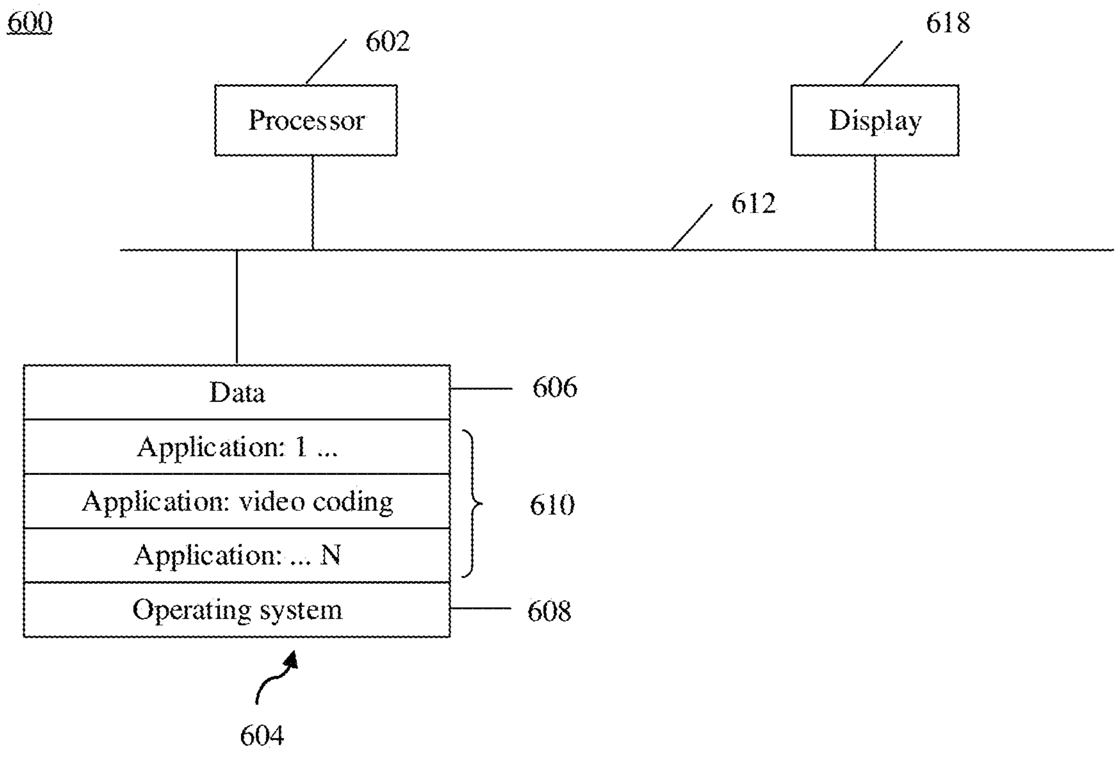
FIG. 6 is an example block diagram of an apparatus according to an embodiment of this application.

FIG. 6 is an example block diagram of an apparatus 600 according to an embodiment of this application. The apparatus 600 may be used as either or both of the source device 12 and the destination device 14 in FIG. 1*a*.

A processor 602 in the apparatus 600 may be a central processing unit. Alternatively, the processor 602 may be any other type of device or a plurality of devices, capable of manipulating or processing information existing or to be developed in the future. Although the disclosed implementations may be implemented by using a single processor such as the processor 602 shown in the figure, a higher speed and higher efficiency are achieved by using more than one processor.

In an implementation, a memory 604 in the apparatus 600 may be a read-only memory (ROM) device or a random access memory (RAM) device. Any other appropriate type of storage device may be used as the memory 604. The memory 604 may include code and data 606 that are accessed by the processor 602 through a bus 612. The memory 604 may further include an operating system 608 and an application 610. The application 610 includes at least one program that permits the processor 602 to perform the method described in this specification. For example, the application 610 may include applications 1 to N, and further include a video coding application for performing the method described in this specification.

The apparatus 600 may further include one or more output devices, such as a display 618. In an example, the display 618 may be a touch-sensitive display combined with a display with a touch-sensitive element that can be used to sense a touch input. The display 618 may be coupled to the processor 602 through the bus 612.

Although the bus 612 in the apparatus 600 is described in this specification as a single bus, the bus 612 may include a plurality of buses. Further, a secondary storage may be directly coupled to another component of the apparatus 600 or may be accessed through a network and may include a single integrated unit, for example, a memory card or a plurality of units, for example, a plurality of memory cards. Therefore, the apparatus 600 may have a variety of configurations.

Encoding and decoding methods provided in embodiments of this application may be applied to various encoding and decoding scenarios.

For example, the encoding and decoding methods provided in embodiments of this application may be applied to an N-end (that is, N-device) collaborative rendering scene, where N is an integer greater than 1.

In a possible scene, one device may generate rendering input information (the rendering input information may include one or more of a three-dimensional object model (which may also be referred to as a 3D (3-dimension, three-dimensional) object model), probe data, and the like, this is not limited in embodiments of this application, and in this embodiment of this application, an example in which the rendering input information is probe data is used for description), and then distribute the probe data to the other N−1 devices. After receiving the probe data, the N−1 devices may determine shading effect on an object (corresponding to the three-dimensional object model) in a three-dimensional scene based on the probe data in a rendering process. After rendering is completed, a rendered picture may be obtained.

In a possible scene, N1 (a value range of N1 is 2 to N, where N1 may be equal to 2 or N, and N1 is an integer) devices may collaboratively generate probe data, where each of the N1 devices generates a part of the probe data. Then, each of the N1 devices distributes the part of the probe data generated by the device to the other N−N1 devices. After receiving the probe data, in a rendering process, each of the N1 devices may determine shading effect on an object in a three-dimensional scene based on the received probe data and the part of the probe data generated by the device. After rendering is completed, a rendered picture may be obtained. After receiving the probe data, the N−N1 devices may determine shading effect on the object in the three-dimensional scene based on the received probe data in the rendering process. After rendering is completed, a rendered picture may be obtained.

For ease of description, a device that generates probe data in the N-end collaborative rendering scene may be referred to as a first device, and a device that is used for rendering and that determines shading effect on an object in a three-dimensional scene based on the probe data in a rendering process may be referred to as a second device. A device may be a first device or a second device. This is not limited in this application. The first device may be a server, or may be a terminal. The second device may be a terminal.

Figure 7A:
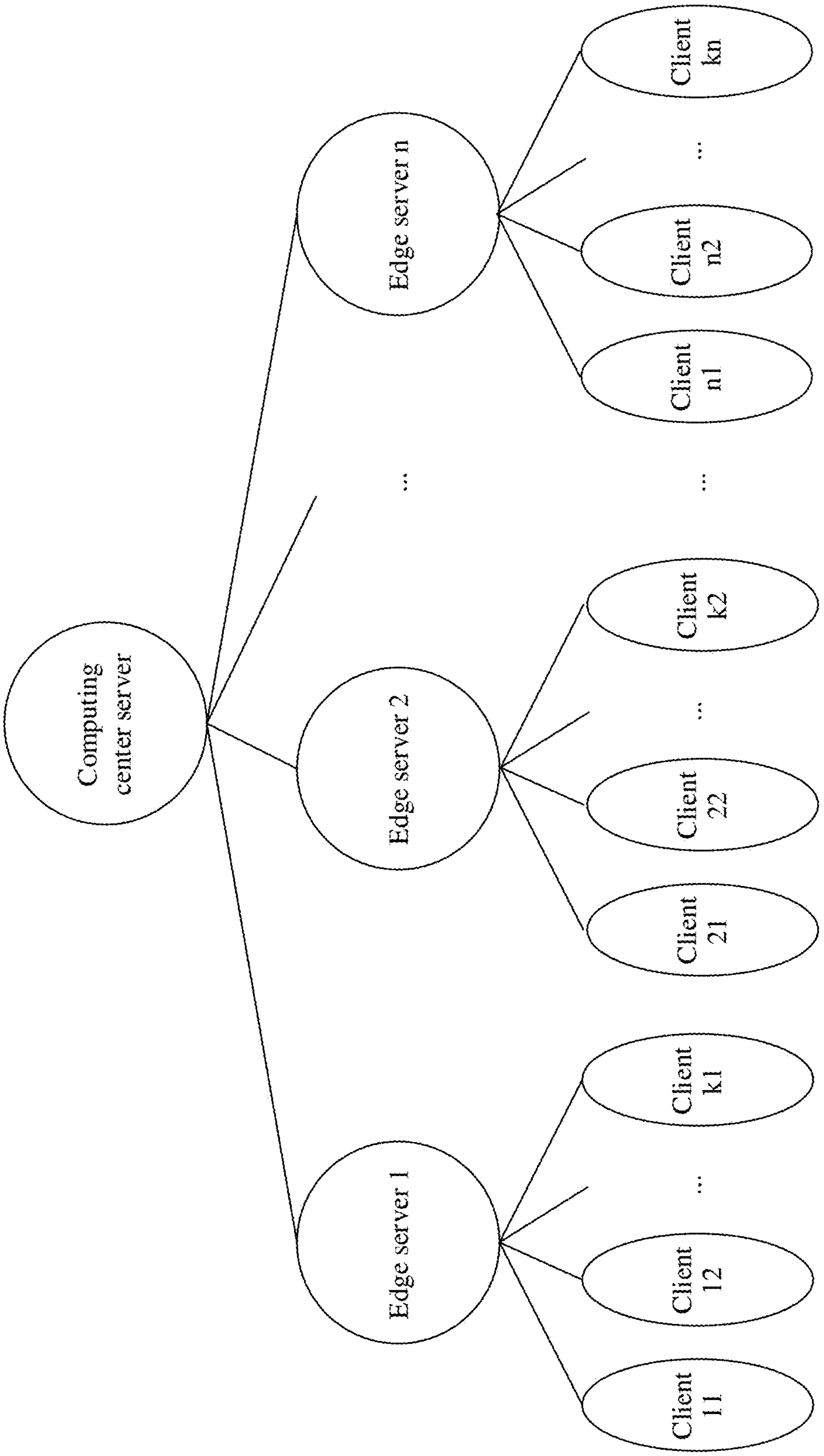
FIG. 7*a* is a diagram of a system framework according to an embodiment of this application.

FIG. 7*a* is a diagram of an example of a system framework. In an embodiment of FIG. 7*a*, the first device is a computing center server disposed in a cloud, and the second device is a client. FIG. 7*a* is the diagram of the example of the framework of a device-cloud collaborative rendering system.

Refer to FIG. 7*a*. For example, the device-cloud collaborative rendering system may include the computing center server, an edge server, and a client, where n (n is an integer greater than 1) edge servers may be included, k1+k2+ . . . +kn clients may be included, and k1, k2, . . . , and kn are all positive integers. The computing center server is connected to the n edge servers, and each edge server is connected to at least one client. As shown in FIG. 7*a*, an edge server 1 is connected to k1 clients: a client 11, a client 12, . . . , and a client 1*k*1, an edge server 2 is connected to k2 clients: a client 21, a client 22, . . . , and a client 2*k*2, and an edge server n is connected to kn clients: a client n1, a client n2, . . . , and a client nkn.

For example, the computing center server may be a server, or may be a server cluster. This is not limited in embodiments of this application.

For example, the quantity n of edge servers is not limited in embodiments of this application, and may be specifically set based on an actual application scenario. This is not limited in embodiments of this application.

For example, a quantity of clients connected to each edge server is not limited in embodiments of this application, and may be specifically set based on an actual application scenario. In addition, quantities of clients connected to the edge servers may be the same or different (that is, k1, k2, . . . , and kn may be equal or unequal). This may be specifically set based on an actual application scenario. This is also not limited in embodiments of this application.

For example, the client may include but is not limited to a terminal device such as a personal computer, a mobile phone, or a VR wearable device.

It should be understood that the framework of the device-cloud collaborative rendering system shown in FIG. 7*a* is merely an example of a framework of a device-cloud collaborative rendering system in this embodiment of this application. In the device-cloud collaborative rendering system in this embodiment of this application, a computing center server and an edge server may be a same server. Alternatively, the device-cloud collaborative rendering system in this embodiment of this application does not include an edge server, but a computing center server is connected to each client. This is not limited in embodiments of this application. In this embodiment of this application, the framework of the device-cloud collaborative rendering system shown in FIG. 7*a* is used as an example for description.

For example, the computing center server may be configured to generate probe data.

For example, the edge server may be configured to distribute the probe data.

For example, the client may be configured to perform rendering and display a rendered picture. In a rendering process, shading effect on an object in a three-dimensional scene may be determined based on the probe data.

In a possible implementation, the computing center server may be further configured to perform rendering and display a rendered picture.

In a possible implementation, the edge server may be further configured to generate probe data, perform rendering, and display a rendered picture.

For example, multi-end collaborative rendering scene such as cloud gaming, cloud exhibition, indoor decoration, a clothing design, and an architectural design all may be implemented by using the framework of the device-cloud collaborative rendering system shown in FIG. 7*a*.

For example, in the cloud gaming scene, after receiving a field of view switching indication sent by the client 11, the computing center server may generate probe data of a gaming scene corresponding to a target field of view, and then send the probe data to the edge server 1; and the edge server 1 sends the probe data to the client 11. After receiving the probe data, the client 11 may perform rendering, and determine, based on the received probe data in a rendering process, shading effect on an object in the gaming scene corresponding to the target field of view. After rendering is completed, a picture of the gaming scene corresponding to the target field of view may be obtained and displayed.

For example, in the indoor decoration scene, after receiving a furniture adding indication sent by the client 21, the computing center server may generate probe data corresponding to a living room scene to which target furniture is added, and then send the probe data to the edge server 2; and the edge server 2 sends the probe data to the client 21. After receiving the probe data, the client 21 may perform rendering, and determine, based on the received probe data in a rendering process, shading effect on an object in the living room scene to which the target furniture is added. After rendering is completed, a picture of a living room to which the target furniture is added may be obtained and displayed.

For ease of subsequent description, the following describes a process in which the computing center server generates the probe data and a process in which the client determines the shading effect on the object in the three-dimensional scene based on the probe data in the rendering process.

The process in which the computing center server generates the probe data is as follows.

For example, the rendering process of the computing center server may be as follows: A three-dimensional object model (which may include a model of a person or a model of an object) is loaded to a three-dimensional scene (which may also be referred to as a 3D scene) (therefore, the three-dimensional object model can be converted into an object in the three-dimensional scene), and then the object in the three-dimensional scene may be rendered to obtain a current frame (that is, a rendered picture). In a process of rendering the object in the three-dimensional scene, a plurality of probes may be placed in the three-dimensional scene, an ambient environment is detected by using the probes, to obtain probe data, and then shading effect on the object in the three-dimensional scene is determined based on the probe data, so as to simulate the shading effect on the object in the three-dimensional scene after a light ray in the three-dimensional scene is reflected for a plurality of times.

Figure 7B:
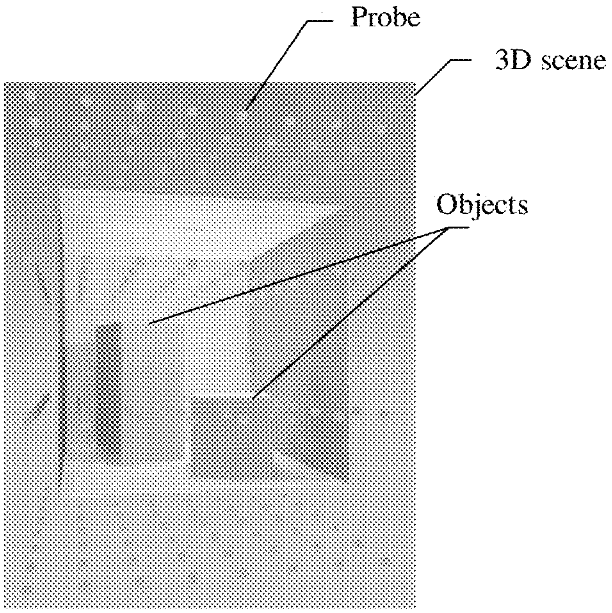
FIG. 7*b* is a diagram of probe distribution in a three-dimensional scene according to an embodiment of this application.

FIG. 7*b* is a diagram of an example of probe distribution in a three-dimensional scene. Each ball in FIG. 7*b* represents one probe. In an embodiment of FIG. 7*b*, the probe is a DDGI probe.

Refer to FIG. 7*b*. For example, a position at which each probe is placed in the three-dimensional scene and a position relationship between each probe and another probe may be set based on a requirement. This is not limited in embodiments of this application. For example, in FIG. 7*b*, distances between each probe and six probes in six directions (at the upper side, the lower side, the front side, the rear side, the left side, and the right side) around the probe are equal. In addition, a quantity of probes placed in the three-dimensional scene may also be set based on a requirement. This is also not limited in embodiments of this application.

After a plurality of probes are placed in the three-dimensional scene, corresponding attribute data (the attribute data is used in a rendering process) may be configured for each probe based on a scene requirement. The attribute data includes but is not limited to: a probe type (such as a reflection probe or a DDGI probe), a probe enable identifier, a probe position, a probe position offset (for example, after the probes are placed in a preset manner, initial positions of the probes may be obtained, and positions of some probes may be adjusted to obtain better shading effect, and therefore, for each of these probes, an offset between an adjusted position and the initial position may be referred to as a probe position offset, for example, after the probes are placed in a manner shown in FIG. 7*b*, distances between each probe and six probes around the probe are equal; or if a position of one probe is adjusted, distances between the probe and six probes around the probe are unequal), and the like. This is not limited in this application.

For example, after the plurality of probes are placed in the three-dimensional scene, each probe may detect a probe-centered ambient environment, that is, detect features of a probe-centered ambient object in the three-dimensional scene, and record these features as environment data of the probe. Ambient environment data includes at least one of the following: illumination data, a color, visibility data, a material, a normal direction, or texture coordinates. The illumination data may be used to describe emergent illumination of an ambient object of a probe. The visibility data, that is, distribution data of distances between the probe and the objects at all angles, includes data such as an average value of distances corresponding to each angle, squares of the distances, and a variance of the distances.

For example, illumination data and visibility data that correspond to each probe may be generated according to a DDGI algorithm. The following uses one probe in a current frame as an example to describe a process of generating illumination data and visibility data of the probe. First, several light rays emitted from the probe are sampled, and first intersection points of the several light rays and objects in the three-dimensional scene are calculated. Then, a distance between the probe and the first intersection point of each of the several light rays of the probe and each object in the three-dimensional scene is calculated, to obtain initial distance data; and illumination at the first intersection point of each of the several light rays and each object in the three-dimensional scene is calculated, to obtain initial illumination data. Subsequently, the initial distance data may be converted into spherical data in a continuous domain from a discrete domain. Specifically, filtering processing may be performed on the initial distance data on a spherical surface according to a cos kernel function, to obtain candidate distance data. In addition, the initial distance data may be converted into the spherical data in the continuous domain from the discrete domain. Similarly, filtering processing may be performed on a square of the initial distance data on the spherical surface according to a cos ^k kernel function (k is a positive integer), to obtain a square of the candidate distance data. In addition, the initial illumination data may be converted into spherical data in a continuous domain from a discrete domain. Specifically, filtering processing may be performed on the initial illumination data on the spherical surface according to the cos ^k kernel function (k is a positive integer), to obtain candidate illumination data. Then, weighted calculation is performed on the candidate distance data of the probe and distance data of the probe in a previous frame, to obtain distance data of the probe in the current frame. Weighted calculation is performed on the square of the candidate distance data of the probe and a square of the distance data of the probe in the previous frame, to obtain a square of the distance data of the probe in the current frame. Weighted calculation is performed on the candidate illumination data of the probe and illumination data of the probe in the previous frame, to obtain the illumination data of the probe in the current frame. Therefore, illumination data and visibility data of all probes in the current frame may be obtained.

For example, attribute data and environment data that are used in the rendering process may form probe data of a probe.

For example, illumination data and visibility data of each probe both may be represented by a two-dimensional picture, may be represented by a spherical harmonic function basis coefficient, or may be represented by a spherical wavelet basis coefficient. This is not limited in this application.

It should be noted that, it is assumed that the three-dimensional scene includes M (M is a positive integer) probes, where M1 probes have any one of illumination data, visibility data, and attribute data, M2 probes have any two of illumination data, visibility data, and attribute data, M3 probes have illumination data, visibility data, and attribute data, and M4 probes have no probe data. M1+M2+M3+M4=M, M1, M2, M3, and M4 are all integers, and values of M1, M2, M3, and M4 may be set based on a requirement. This is not limited in embodiments of this application.

The process in which the client determines the shading effect on the object in the three-dimensional scene based on the probe data in the rendering process is as follows.

For example, in the rendering process of the client, the probe data is used to calculate the shading effect on the object in the three-dimensional scene. Specifically, when each pixel is rendered, coordinates of 3D space corresponding to the pixel are first obtained, and then eight probes surrounding the coordinates are searched for. Then, a contribution weight of each probe to the pixel is calculated based on visibility data of the probe, that is, whether the probe and 3D coordinates of the probe are visible to each other is determined based on a distance. If the probe and the 3D coordinates of the probe are invisible to each other, the weight is 0. If the probe and the 3D coordinates of the probe are visible to each other, the contribution weight of the probe is calculated based on a square of the distance. Then, weighted averaging is performed on illumination data of the probe based on the contribution weight, to obtain a shading result on the pixel.

Because an amount of data of probe data is large, the computing center server can compress the probe data and then send the probe data to the client, to reduce a network bandwidth.

Figure 8A:
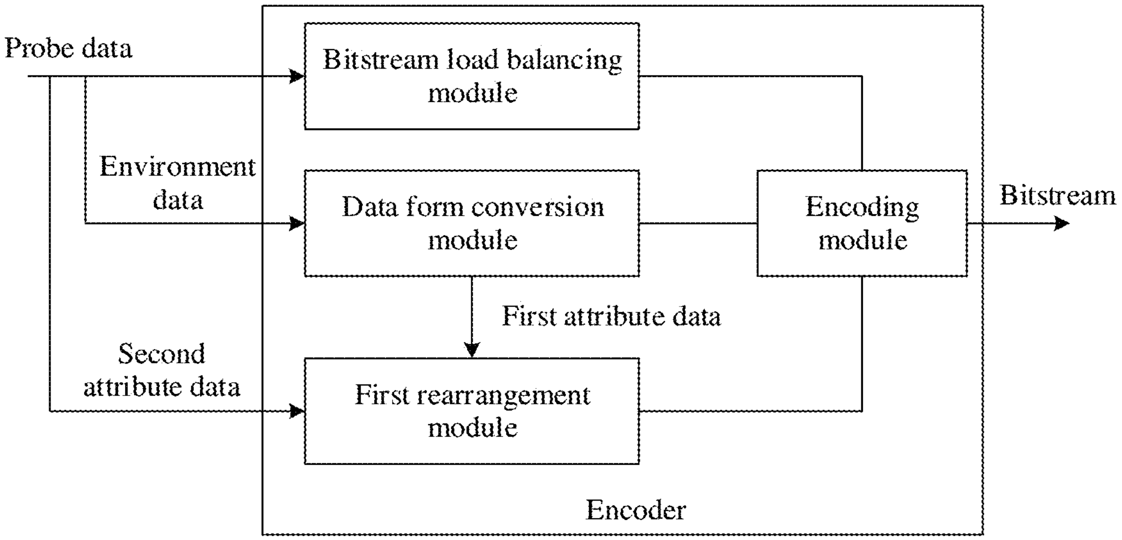
FIG. 8*a* is a diagram of an encoding framework according to an embodiment of this application.

FIG. 8*a* is a diagram of an example of an encoding framework.

Refer to FIG. 8*a*. For example, an encoder may include a bitstream load balancing module, a data form conversion module, a first rearrangement module, and an encoding module.

For example, the bitstream load balancing module may be configured to determine a probe data encoding scheme (for example, intra encoding or inter encoding).

For example, the data form conversion module may be configured to: perform data form conversion on environment data, to convert the environment data into a more compact representation; or increase a quantity of bits occupied in a bitstream by data that has higher importance and that is required in a rendering process.

For example, the first rearrangement module may be configured to rearrange attribute data of a probe.

The attribute data of the probe may include attribute data (referred to as first attribute data subsequently) used for data form conversion and attribute data (referred to as second attribute data subsequently) used in the rendering process.

For example, the encoding module is configured to perform encoding, to obtain a bitstream.

It should be noted that steps performed by the bitstream load balancing module, the data form conversion module, and the first rearrangement module are included in steps in an encoding procedure of the encoder.

It should be understood that FIG. 8*a* shows merely an example of the encoder in this embodiment of this application, and the encoder in this embodiment of this application may have fewer modules than those in FIG. 8*a*. For example, the encoder includes a bitstream load balancing module, a data form conversion module, and an encoding module. For another example, the encoder includes a data form conversion module, a first rearrangement module, and an encoding module. For another example, the encoder includes a data form conversion module and an encoding module. In addition, the encoder in this embodiment of this application may have more modules than those in FIG. 8*a*. This is not limited in embodiments of this application.

It should be understood that the bitstream load balancing module, the data form conversion module, the first rearrangement module, and the encoding module in FIG. 8*a* may be modules independent of each other, or any two or more of the modules are an entirety. This is not limited in embodiments of this application. In addition, the bitstream load balancing module, the data form conversion module, the first rearrangement module, and the encoding module are logical modules. The encoder may be further divided into other modules or these modules have other names. This is also not limited in embodiments of this application.

It should be understood that the encoder includes only the encoding module, the bitstream load balancing module, the data form conversion module, and the first rearrangement module, that may be independent of the encoder. This is not limited in embodiments of this application. In this embodiment of this application, the encoder in FIG. 8*a* is used as an example for description.

Figure 8B:
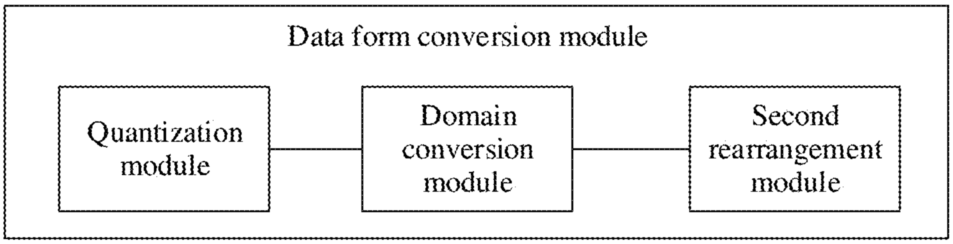
FIG. 8*b* is a diagram of a structure of a data form conversion module according to an embodiment of this application.

FIG. 8*b* is a diagram of an example of a structure of a data form conversion module.

Refer to FIG. 8*b*. For example, the data form conversion module may include a quantization module, a domain conversion module, and a second rearrangement module.

For example, the quantization module may be configured to perform quantization.

For example, the domain conversion module may be configured to perform domain conversion.

For example, the domain conversion may be converting a representation form of data from one domain to another domain. Domains may be classified from different perspectives based on a requirement. For example:

From a perspective of normalization, the domains may be classified into a normalized domain and a non-normalized domain.

From a perspective of color space, the domains can be classified into an RGB domain, a YUV domain, an XYZ domain, and a Lab domain.

From a perspective of a value change curve, the domains may be classified into a linear domain and a non-linear domain, where the non-linear domain may be an exponential domain, a PQ (perceptual quantization) domain, an HLG (hybrid log gamma) domain, or the like.

From a perspective of a value representation form, the domains may be classified into a picture domain and a transform domain. For example, the picture domain may be a domain represented by a picture. For example, the transform domain may be a domain represented by a basis function and a corresponding coefficient. Data Y(t) in a transform basis domain may be approximated based on x bases e_1(*t*) to e_x(t), so that the data Y(t) is approximately equal to a sum of x transform bases multiplied by a corresponding transform coefficient. The transform basis includes but is not limited to a spherical harmonic function basis, a spherical wavelet basis, an eigenvector, and the like. This is not limited in this application.

For example, the second rearrangement module may be configured to rearrange data.

It should be understood that FIG. 8*b* shows merely an example of the data form conversion module in this embodiment of this application. The data form conversion module in this embodiment of this application may have fewer modules than those in FIG. 8*b*. For example, the data form conversion module includes only a domain conversion module. For another example, the data form conversion module includes only a quantization module and a domain conversion module. For another example, the data form conversion module includes only a domain conversion module and a second rearrangement module. This is not limited in embodiments of this application. In addition, the data form conversion module in this embodiment of this application may have more modules than those in FIG. 8*b*. This is also not limited in embodiments of this application.

It should be understood that the quantization module, the domain conversion module, and the second rearrangement module in FIG. 8*b* may be modules independent of each other, or any two or more of the modules are an entirety. This is not limited in embodiments of this application. In addition, the quantization module, the domain conversion module, and the second rearrangement module are logical modules, and the data form conversion module may be further divided into other modules or these modules have other names. This is also not limited in embodiments of this application.

Figure 9A:
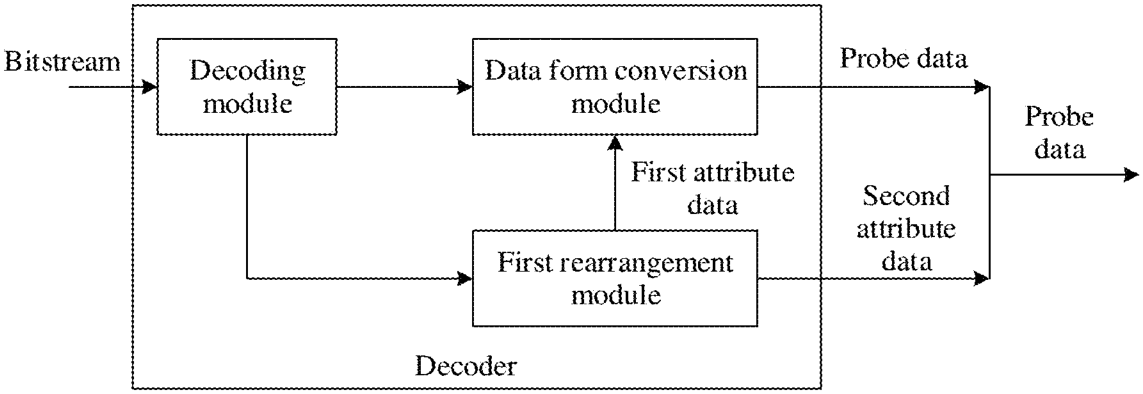
FIG. 9*a* is a diagram of a decoding framework according to an embodiment of this application.

FIG. 9*a* is a diagram of an example of a decoding framework. In an embodiment of FIG. 9*a*, the decoding framework corresponding to the encoding framework in FIG. 8*a* is described.

Refer to FIG. 9*a*. For example, a decoder may include a data form conversion module, a first rearrangement module, and a decoding module.

For example, the data form conversion module may be configured to perform data form conversion on a part of data obtained by decoding a bitstream, to obtain probe data.

For example, the first rearrangement module may be configured to rearrange the other part of data obtained by decoding the bitstream, to obtain attribute data of a probe. The attribute data of the probe may include attribute data (referred to as first attribute data subsequently) used for data form conversion and attribute data (referred to as second attribute data subsequently) used in a rendering process.

For example, the decoding module is configured to decode the bitstream.

It should be understood that a data form conversion process of the data form conversion module in the decoder is an inverse process of a data form conversion process of a data form conversion module in an encoder. A rearrangement process of the first rearrangement module in the decoder is an inverse process of a rearrangement process of a first rearrangement module in the encoder.

It should be noted that steps performed by the data form conversion module and the first rearrangement module are included in steps in a decoding procedure of the decoder.

It should be understood that FIG. 9*a* shows merely an example of the decoder in this embodiment of this application. The decoder in this embodiment of this application may have fewer modules than those in FIG. 9*a*. For example, the decoder includes a data form conversion module and a decoding module. This is not limited in embodiments of this application. Alternatively, the decoder in this embodiment of this application may have more modules than those in FIG. 9*a*. This is not limited in embodiments of this application.

It should be understood that the data form conversion module, the first rearrangement module, and the decoding module in FIG. 9*a* may be modules independent of each other, or any two or more of the modules are an entirety. This is not limited in embodiments of this application. In addition, the data form conversion module, the first rearrangement module, and the decoding module are logical modules. The decoder may be further divided into other modules or these modules have other names. This is also not limited in embodiments of this application.

It should be understood that the decoder includes only the decoding module, the data form conversion module, and the first rearrangement module, that may be independent of the decoder. This is not limited in embodiments of this application. In this embodiment of this application, the decoder in FIG. 9*a* is used as an example for description.

Figure 9B:
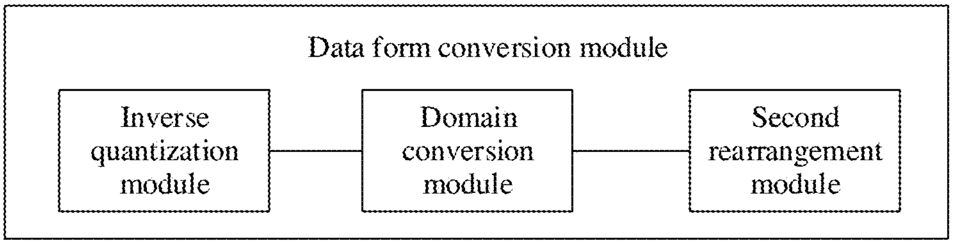
FIG. 9*b* is a diagram of a structure of another data form conversion module according to an embodiment of this application.

FIG. 9*b* is a diagram of an example of a structure of a data form conversion module.

Refer to FIG. 9*b*. For example, the data form conversion module may include an inverse quantization module, a domain conversion module, and a second rearrangement module.

For example, the inverse quantization module may be configured to perform inverse quantization. It should be understood that an inverse quantization process of the inverse quantization module in the decoder is an inverse process of a quantization process of a quantization module in an encoder.

For example, the domain conversion module may be configured to perform domain conversion. It should be understood that a domain conversion process of the domain conversion module in the decoder is an inverse process of a domain conversion process of a domain conversion module in the encoder.

For example, the second rearrangement module may be configured to rearrange data. It should be understood that a rearrangement process of the second rearrangement module in the decoder is an inverse process of a rearrangement process of a second rearrangement module in the encoder.

It should be understood that FIG. 9*b* shows merely an example of the data form conversion module in this embodiment of this application, and the data form conversion module in this embodiment of this application may have fewer modules than those in FIG. 9*b*. For example, the data form conversion module includes only an inverse quantization module and a domain conversion module, or the data form conversion module includes only a domain conversion module and a second rearrangement module. This is not limited in embodiments of this application. Alternatively, the data form conversion module in this embodiment of this application may have more modules than those in FIG. 9*b*. This is not limited in embodiments of this application.

It should be understood that the inverse quantization module, the domain conversion module, and the second rearrangement module in FIG. 9*b* may be modules independent of each other, or any two or more of the modules are an entirety. This is not limited in embodiments of this application. In addition, the inverse quantization module, the domain conversion module, and the second rearrangement module are logical modules, and the data form conversion module may be further divided into other modules or these modules have other names. This is also not limited in embodiments of this application.

Figure 10:
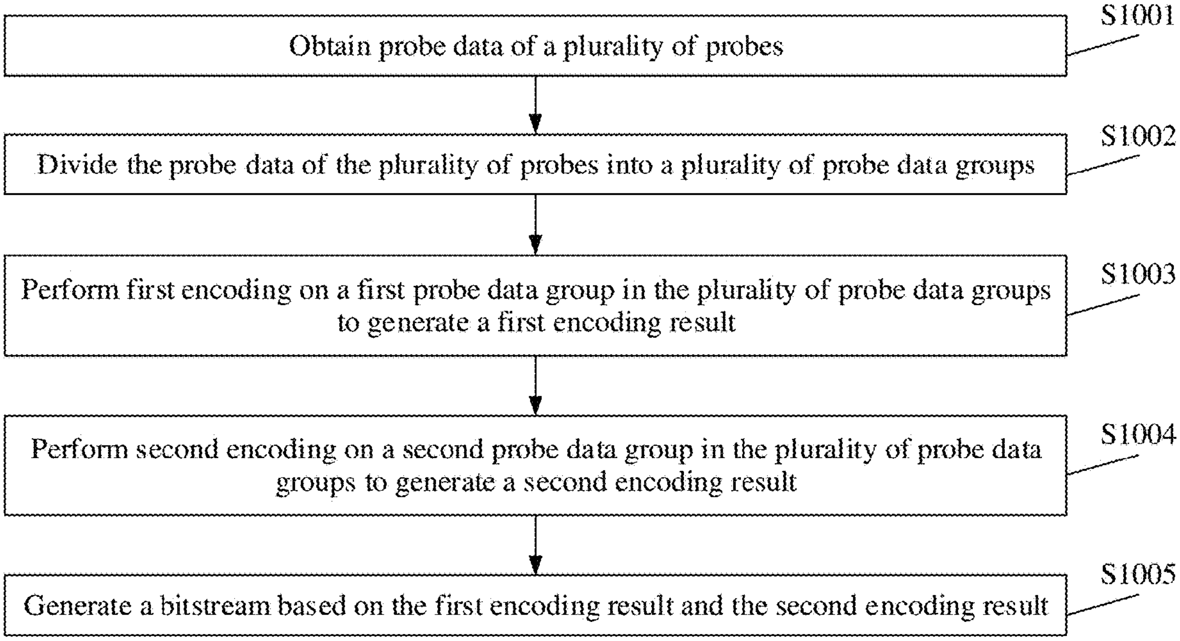
FIG. 10 is a schematic flowchart of an encoding method according to an embodiment of this application.

FIG. 10 is a flowchart of an encoding method according to an embodiment of this application. The encoding method may be performed by the foregoing encoder. The encoding method is described as a series of steps or operations. It should be understood that the encoding method may be performed in various sequences and/or simultaneously, and is not limited to an execution sequence shown in FIG. 10. As shown in FIG. 10, the encoding method may include the following steps.

S1001: Obtain probe data of a plurality of probes.

The probe data may include attribute data and ambient environment data.

The ambient environment data in the probe data is attribute data in different directions at each probe, such as illumination data, visibility data, a color, a material, a normal direction, and texture coordinates.

The attribute data in the probe data may include a probe type, whether a probe is enabled, a probe position, an offset of the probe relative to an initial position, a parameter used in an encoding process of the ambient environment data, and the like. Details are not listed herein.

Sometimes, a probe volume including a plurality of probes is also used. In this case, information about a quantity of probes included in the probe volume also belongs to the attribute data of the probe.

For example, in a cloud gaming scene, after receiving a field of view switching indication sent by a client, a computing center server may detect an ambient environment by using a plurality of probes placed in the cloud gaming scene, to generate probe data of the gaming scene corresponding to a target field of view, and then send the probe data to an edge server.

For another example, in an indoor decoration scene, after receiving a furniture adding indication sent by a client, a computing center server may detect an ambient environment by using a plurality of probes placed in the indoor decoration scene, to generate probe data corresponding to a living room scene to which target furniture is added, and then send the probe data to an edge server.

In a possible implementation, probe data of a plurality of probes in a current frame may be obtained.

In another possible implementation, probe data of a plurality of probes in a current frame and probe data in a non-current frame may be obtained.

In still another possible implementation, probe data of a single probe may be obtained.

S1002: Divide the probe data of the plurality of probes into a plurality of probe data groups.

In a possible implementation, the probe data may be divided into the plurality of probe data groups based on target information of the probe data.

In a possible implementation, for probe data of a same probe in different frames, same target information may exist, that is, the target information of the probe data of the same probe in the different frames may be the same.

In another possible implementation, for probe data of a same probe in different frames, target information in a corresponding frame may also exist, that is, for each piece of probe data in the probe data of the same probe in the different frames, one piece of target information may exist independently. Correspondingly, the probe data of the same probe needs to be grouped based on target information of the probe in different frames during grouping.

For example, probe data 1 and target information 1 (namely, target information of the probe data 1) of a probe A exist in a frame 1, and probe data 2 and target information 2 (namely, target information of the probe data 2) of the probe A exist in a frame 2. The probe data 1 needs to be grouped based on the target information 1 during grouping, and the probe data 2 needs to be grouped based on the probe data 2 during grouping.

It can be learned that, although both the probe data 1 and the probe data 2 are grouped based on the target information of the probe A during grouping, target information of the probe A in different frames is used.

In addition, when the probe data includes probe data of a same probe in different frames, the probe data of the probe in the different frames may be divided into one group, or may not be divided into one group. This is not limited in this application.

When the probe data of the plurality of probes includes the probe data in the current frame and the probe data in the non-current frame, the plurality of probe data groups include at least one probe data group including the probe data in the current frame and the probe data in the non-current frame.

In another possible implementation, the probe data may be randomly divided into the plurality of probe data groups.

In still another possible implementation, the probe data may be divided into the plurality of probe data groups in a preset grouping manner.

Optionally, the target information may include a diffuse reflection coefficient.

In a possible implementation, illumination data in the probe data may be divided into a plurality of probe data groups based on the diffuse reflection coefficient of the probe data of the plurality of probes.

In a possible implementation, a first difference between each probe and at least one first target probe of the probe may be determined based on a diffuse reflection coefficient of probe data of the probe in the plurality of probes and a diffuse reflection coefficient of probe data of the at least one first target probe of the probe, and then the illumination data in the probe data is divided into the plurality of probe data groups based on the first difference. A target probe of each probe is a probe whose distance from the probe is less than a first threshold. The first difference may be a PSNR or an MSE.

It should be noted that each probe and the probe itself are also first target probes of each other. For example, a probe A in a current frame and the probe A in a non-current frame are first target probes of each other.

It should be noted that the first threshold may be greater than a distance between two probes that are farthest from each other in the plurality of probes, so that any two probes in the plurality of probes are first target probes of each other.

Optionally, the target information may include distance data.

In a possible implementation, visibility data in the probe data may be divided into a plurality of probe data groups based on the distance data of the probe data of the plurality of probes.

In a possible implementation, a second difference between each probe and at least one second target probe of the probe may be determined based on distance data of probe data of the probe in the plurality of probes and distance data of probe data of the at least one second target probe of the probe, and the visibility data in the probe data is divided into the plurality of probe data groups based on the second difference. The second target probe of each probe is a probe whose distance from the probe is less than a second threshold. The second difference may be a PSNR or an MSE.

It should be noted that each probe and the probe itself are also second target probes of each other. For example, a probe B in a current frame and the probe B in a non-current frame are second target probes of each other.

It should be noted that the second threshold may be greater than a distance between two probes that are farthest from each other in the plurality of probes, so that any two probes in the plurality of probes are second target probes of each other.

Optionally, the visibility data may include at least one of the following: distance data, square data of a distance, or variance data of distances.

Optionally, the target information may also include other information, for example, a color, a material, a normal direction, and texture coordinates.

In a possible implementation, the probe data may be divided into the plurality of probe data groups based on other information (such as colors, materials, normal directions, and texture coordinates) of the plurality of probes.

Optionally, the target information may also include reference grouping information, and the reference grouping information indicates a grouping manner of reference probe data. The reference probe data may be probe data of the plurality of probes in a previous frame of the current frame.

In a possible implementation, the probe data may be divided into the plurality of probe data groups based on the reference grouping information.

In a possible implementation, when the probe data includes probe data in N frames, the probe data in the N frames may be divided into N probe data groups.

Optionally, each of the N probe data groups includes 1/N of probe data in each frame.

For example, when the probe data includes probe data in two frames (a first frame and a second frame), the probe data may be divided into two groups (a first data group and a second data group). The first data group includes half of the probe data in the first frame and the second frame. The second data group includes the other half of the probe data in the first frame and the second frame.

After the probe data is divided into the plurality of probe data groups, the probe data may also be arranged into a two-dimensional picture based on a grouping status of the probe data. The two-dimensional picture includes a plurality of picture blocks, and the plurality of picture blocks one-to-one correspond to the plurality of probe data groups.

For example, after the probe data is divided into three probe data groups (which are respectively a probe data group 1, a probe data group 2, and a probe data group 3), the probe data may be arranged into a two-dimensional picture based on a grouping status of the probe data, and the two-dimensional picture includes three picture blocks (which are respectively a picture block 1, a picture block 2, and a picture block 3). The picture block 1 corresponds to the probe data group 1, the picture block 2 corresponds to the probe data group 2, and the picture block 3 corresponds to the probe data group 3.

Optionally, the two-dimensional picture may be rectangular, and the picture block may be non-rectangular. When the two-dimensional picture is rectangular, the two-dimensional picture may not be exactly arranged into a rectangle during arrangement, and a vacant part is supplemented with invalid data.

In a possible implementation, the probe data may be arranged into the two-dimensional picture in an order of a Hilbert curve or a pseudo Hilbert curve based on the grouping status of the probe data.

After the probe data is divided into the plurality of probe data groups, the plurality of probe data groups may also be arranged into a plurality of two-dimensional pictures. The plurality of two-dimensional pictures one-to-one correspond to the plurality of probe data groups.

For example, after the probe data is divided into three probe data groups (which are respectively a probe data group 1, a probe data group 2, and a probe data group 3), the probe data may be arranged into three two-dimensional pictures (which are respectively a two-dimensional picture 1, a two-dimensional picture 2, and a two-dimensional picture 3) based on a grouping status of the probe data. The two-dimensional picture 1 corresponds to the probe data group 1, the two-dimensional picture 2 corresponds to the probe data group 2, and the two-dimensional picture 3 corresponds to the probe data group 3.

After the probe data is divided into the plurality of probe data groups, the probe data may also be arranged into a three-dimensional picture based on a grouping status of the probe data.

In a possible implementation, the probe data of the single probe may also be divided into a plurality of probe data groups.

S1003: Perform first encoding on a first probe data group in the plurality of probe data groups to generate a first encoding result.

Optionally, the first probe data group may be a probe data group that is in the plurality of probe data groups and that corresponds to a frame number of the current frame.

For example, probe data in each frame may be divided into nine groups. A first group of probe data in each frame is a first probe data group in a tenth frame, a $100^{th}$ frame, a $190^{th}$ frame, and . . . , and is a second probe data group in the remaining frames; a second group of probe data in each frame is a first probe data group in a $20^{th}$ frame, a $110^{th}$ frame, a $200^{th}$ frame, and . . . , and is a second probe data group in the remaining frames; a third group of probe data in each frame is a first probe data group in a $30^{th}$ frame, a $120^{th}$ frame, a $210^{th}$ frame, and . . . , and is a second probe data group in the remaining frames; and by analogy, a ninth group of probe data in each frame is a first probe data group in a $90^{th}$ frame, a $180^{th}$ frame, a $270^{th}$ frame, and . . . , and is a second probe data group in the remaining frames.

In a possible implementation, the first probe data may be determined based on preset information. The preset information indicates a correspondence between a group and a frame number.

In a possible implementation, the first encoding may be performed on a picture block that is in the two-dimensional picture and that corresponds to the first probe data group to generate the first encoding result.

In another possible implementation, the first encoding may be performed on a two-dimensional picture that is in the plurality of two-dimensional pictures and that corresponds to the first probe data group to generate the first encoding result.

In a possible implementation, first encoding may also be performed on the first probe data group in the plurality of probe data groups to generate a first bitstream.

S1004: Perform second encoding on a second probe data group in the plurality of probe data groups to generate a second encoding result.

An encoding scheme of the first encoding is different from an encoding scheme of the second encoding.

In a possible implementation, the second encoding is performed on a picture block that is in the two-dimensional picture and that corresponds to the second probe data group to generate the second encoding result.

In another possible implementation, the second encoding is performed on a two-dimensional picture that is in the plurality of two-dimensional pictures and that corresponds to the second probe data group to generate the second encoding result.

In a possible implementation, the first encoding may be intra encoding, and the second encoding may be inter encoding.

In another possible implementation, for same data, rate-distortion curves of the first encoding and the second encoding are different, that is, distortion statuses of the first encoding and the second encoding at a same bit rate are different.

In still another possible implementation, for same data, running time of the first encoding and running time of the second encoding are different.

In still another possible implementation, for same data, overheads of the first encoding and the second encoding are different. The foregoing overheads include but are not limited to memory usage, GPU memory usage, CPU computing overheads, and GPU computing overheads.

In a possible implementation, second encoding may also be performed on the second probe data group in the plurality of probe data groups to generate a second bitstream.

In a possible implementation, an encoding scheme of the first encoding and an encoding scheme of the second encoding may also be the same.

It should be noted that S1003 and S1004 may be performed in parallel, or may be performed in series. This is not limited in embodiments of this application.

S1005: Generate a bitstream based on the first encoding result and the second encoding result.

Optionally, the bitstream may include grouping information, and the grouping information represents a grouping manner of the probe data.

In a possible implementation, the grouping information may be encoded into the bitstream.

A specific method for encoding the grouping information into the bitstream may be any method that can be thought of by a person skilled in the art. For example, the grouping information may be first encoded into the attribute data of the probe, and then attribute data including the grouping information is encoded into the bitstream.

Optionally, the bitstream may include arrangement information, and the arrangement information represents arrangement information of the probe data.

In a possible implementation, the arrangement information further indicates a correspondence between a picture block in a two-dimensional picture or a three-dimensional picture and a probe data group.

In another possible implementation, the arrangement information further indicates a correspondence between a two-dimensional picture or a three-dimensional picture and a probe data group.

In a possible implementation, the arrangement information may be encoded into the bitstream.

A specific method for encoding the arrangement information into the bitstream may be any method that can be thought of by a person skilled in the art. For example, the arrangement information may be first encoded into the attribute data of the probe, and then attribute data including the arrangement information is encoded into the bitstream.

Optionally, the bitstream may include mapping information, and the mapping information indicates a correspondence between a picture block in a two-dimensional picture or a three-dimensional picture and a probe data group.

Optionally, the mapping information further indicates a correspondence between a two-dimensional picture or a three-dimensional picture and a probe data group.

In a possible implementation, the mapping information may be encoded into the bitstream.

A specific method for encoding the mapping information into the bitstream may be any method that can be thought of by a person skilled in the art. For example, the mapping information may be first encoded into the attribute data of the probe, and then attribute data including the mapping information is encoded into the bitstream.

Optionally, the bitstream may include encoding information, and the encoding information represents an encoding scheme of the plurality of probe data groups.

In a possible implementation, the encoding information may be encoded into the bitstream.

A specific method for encoding the encoding information into the bitstream may be any method that can be thought of by a person skilled in the art. For example, the encoding information may be first encoded into the attribute data of the probe, and then attribute data including the encoding information is encoded into the bitstream.

It can be learned that in the encoding method provided in this embodiment of this application, in an encoding process, all obtained probe data is not encoded by using a same encoding scheme, but the probe data is first grouped, and obtained probe data is encoded based on a grouping result by using different encoding schemes. Compared with encoding all the obtained probe data by using a same encoding scheme, encoding the obtained probe data by using the different encoding schemes can improve flexibility of a probe data encoding scheme.

Figure 11:
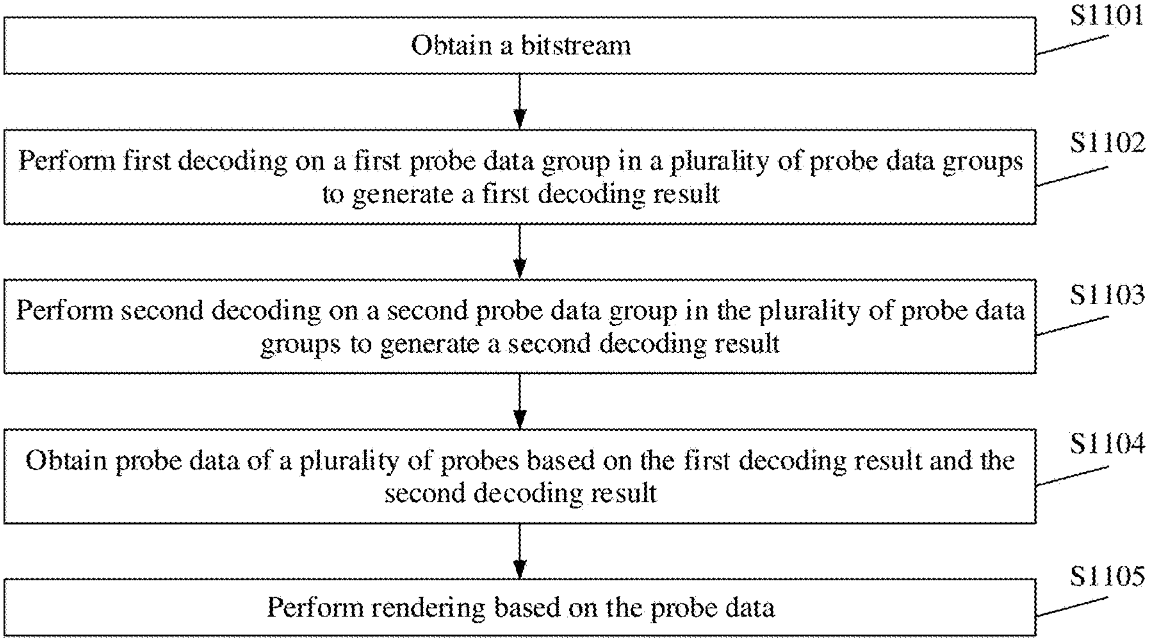
FIG. 11 is a schematic flowchart of a decoding method according to an embodiment of this application.

FIG. 11 is a flowchart of a decoding method according to an embodiment of this application. The decoding method may be performed by the foregoing decoder. The decoding method is described as a series of steps or operations. It should be understood that the decoding method may be performed in various sequences and/or simultaneously, and is not limited to an execution sequence shown in FIG. 11. As shown in FIG. 11, the decoding method may include the following steps.

S1101: Obtain a bitstream.

The bitstream includes a plurality of pieces of probe data, and the plurality of pieces of probe data belong to a plurality of probe data groups. For example, the plurality of pieces of probe data may belong to nine probe data groups.

For example, in a cloud gaming scene, after receiving a field of view switching indication sent by a client, a computing center server may generate probe data of a gaming scene corresponding to a target field of view, and then send the probe data to an edge server; the edge server encodes the probe data into a bitstream, and then sends the bitstream to the client; and then, the client receives and obtains the bitstream.

For another example, in an indoor decoration scene, after receiving a furniture adding indication sent by a client, a computing center server may generate probe data corresponding to a living room scene to which target furniture is added, and then send the probe data to an edge server; the edge server encodes the probe data into a bitstream, and then sends the bitstream to the client; and then, the client receives and obtains the bitstream.

In a possible implementation, grouping information may be further obtained. The grouping information represents a grouping manner of the plurality of pieces of probe data.

In a possible implementation, the grouping information may be determined based on preset information.

In another possible implementation, the grouping information may be determined based on the bitstream.

In a possible implementation, the plurality of pieces of probe data in the bitstream may be grouped based on the grouping information to obtain the plurality of probe data groups.

In a possible implementation, decoding information may be further obtained, where the decoding information represents a decoding scheme of the plurality of probe data groups, and the decoding scheme includes a decoding scheme corresponding to first decoding and a decoding scheme corresponding to second decoding.

In a possible implementation, the decoding information may be determined based on preset information.

In another possible implementation, the decoding information may be determined based on the bitstream.

In a possible implementation, arrangement information may be further obtained, where the arrangement information represents an arrangement manner of the plurality of pieces of probe data.

In a possible implementation, the arrangement information may be determined based on preset information.

In another possible implementation, the arrangement information may be determined based on the bitstream.

Optionally, the arrangement information further indicates a correspondence between a picture block in a two-dimensional picture or a three-dimensional picture and a probe data group.

Optionally, the arrangement information further indicates a correspondence between a two-dimensional picture or a three-dimensional picture and a probe data group.

In a possible implementation, mapping information may be further obtained. The mapping information indicates a correspondence between a picture block in a two-dimensional picture or a three-dimensional picture and a probe data group.

Optionally, the mapping information further indicates a correspondence between a two-dimensional picture or a three-dimensional picture and a probe data group.

In a possible implementation, the mapping information may be determined based on preset information.

In another possible implementation, the mapping information may be determined based on the bitstream.

Optionally, the bitstream may include a two-dimensional picture, the two-dimensional picture includes a plurality of picture blocks, and the plurality of picture blocks one-to-one correspond to the plurality of probe data groups.

For example, the bitstream may include a two-dimensional picture, the two-dimensional picture may include nine picture blocks, and the nine picture blocks one-to-one correspond to the nine probe data groups.

In a possible implementation, a plurality of bitstreams may also be obtained. The plurality of bitstreams one-to-one correspond to the plurality of probe data groups.

For example, the client may receive nine bitstreams sent by the edge server, and the nine bitstreams one-to-one correspond to the nine probe data groups.

S1102: Perform first decoding on a first probe data group in the plurality of probe data groups to generate a first decoding result.

In a possible implementation, the first decoding may be performed on a picture block that is in the two-dimensional picture and that corresponds to the first probe data group to generate the first decoding result.

In another possible implementation, the first decoding may be performed on a bitstream that is in the plurality of bitstreams and that corresponds to the first probe data group to generate the first decoding result.

S1103: Perform second decoding on a second probe data group in the plurality of probe data groups to generate a second decoding result.

A decoding scheme of the first decoding is different from a decoding scheme of the second decoding.

In a possible implementation, the first decoding may be a decoding scheme corresponding to intra encoding, and the second decoding may be a decoding scheme corresponding to inter encoding.

In another possible implementation, for same data, running time of the first decoding and running time of the second decoding are different.

In still another possible implementation, for same data, overheads of the first decoding and the second decoding are different. The foregoing overheads include but are not limited to memory usage, GPU memory usage, CPU computing overheads, and GPU computing overheads.

In a possible implementation, the second decoding may be performed on a picture block that is in the two-dimensional picture and that corresponds to the second probe data group to generate the second decoding result.

In another possible implementation, the second decoding may be performed on a bitstream that is in the plurality of bitstreams and that corresponds to the second probe data group to generate the second decoding result.

It should be noted that S1102 and S1103 may be performed in parallel, or may be performed in series. This is not limited in embodiments of this application.

S1104: Obtain probe data of a plurality of probes based on the first decoding result and the second decoding result.

A specific method for obtaining the probe data of the plurality of probes based on the first decoding result and the second decoding result may be any method that can be thought of by a person skilled in the art.

S1105: Perform rendering based on the probe data.

A specific method for performing rendering based on the probe data may be any method that can be thought of by a person skilled in the art.

For example, in a cloud gaming scene, rendering may be performed based on the probe data, to determine shading effect on an object in a gaming scene corresponding to a target field of view. After rendering is completed, a picture of the gaming scene corresponding to the target field of view may be obtained and displayed.

For another example, in an indoor decoration scene, rendering may be performed based on the probe data, to determine shading effect on an object in a living room scene to which target furniture is added. After rendering is completed, a picture of a living room to which the target furniture is added may be obtained and displayed.

It can be learned that in the decoding method provided in this embodiment of this application, in a decoding process, all obtained probe data is not decoded by using a same decoding scheme, but obtained probe data in different probe data groups is decoded by using different decoding schemes. Compared with decoding all the obtained probe data by using the same decoding scheme, decoding the obtained probe data in the different probe data groups by using the different decoding schemes can improve flexibility of a probe data decoding scheme.

Figure 12:
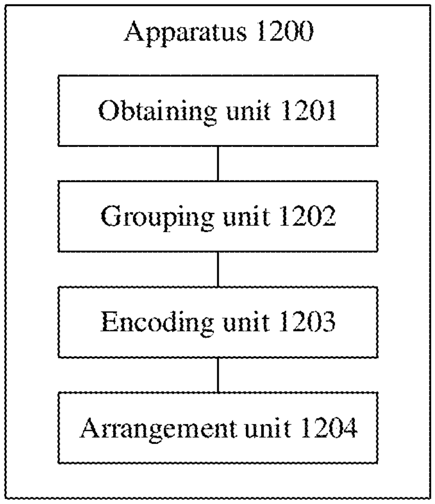
FIG. 12 is a diagram of a structure of an encoding apparatus according to an embodiment of this application.

The following describes, with reference to FIG. 12, an encoding apparatus configured to perform the foregoing encoding method.

It may be understood that, to implement the foregoing function, the encoding apparatus includes a corresponding hardware and/or software module for performing the function. With reference to algorithm steps of each example described in embodiments disclosed in this specification, embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of embodiments of this application.

In embodiments of this application, the encoding apparatus may be divided into functional modules based on the foregoing method examples. For example, each functional module may be obtained through division based on each corresponding function, or two or more functions may be integrated into one processing module. The foregoing integrated module may be implemented in a form of hardware. It should be noted that, in this embodiment, division into modules is an example, and is merely logical function division. During actual implementation, another division manner may be used.

When each functional module is obtained through division based on each corresponding function, FIG. 12 is a possible diagram of composition of the encoding apparatus in the foregoing embodiment. As shown in FIG. 12, the encoding apparatus 1200 may include an obtaining unit 1201, a grouping unit 1202, and an encoding unit 1203.

The obtaining unit 1201 is configured to obtain probe data of a plurality of probes.

For example, the obtaining unit 1201 may be configured to perform S1001 in the foregoing encoding method.

The grouping unit 1202 is configured to divide the probe data into a plurality of probe data groups.

For example, the grouping unit 1202 may be configured to perform S1002 in the foregoing encoding method.

The encoding unit 1203 is configured to: perform first encoding on a first probe data group in the plurality of probe data groups to generate a first encoding result, perform second encoding on a second probe data group in the plurality of probe data groups to generate a second encoding result, and generate a bitstream based on the first encoding result and the second encoding result. An encoding scheme of the first encoding is different from an encoding scheme of the second encoding.

For example, the encoding unit 1203 may be configured to perform S1003, S1004, and S1005 in the foregoing encoding method.

In a possible implementation, the grouping unit 1202 is configured to divide the probe data into the plurality of probe data groups based on target information of the probe data.

In a possible implementation, the target information includes a three-dimensional spatial position. The grouping unit 1202 is configured to divide the probe data into the plurality of probe data groups based on three-dimensional spatial positions of the plurality of probes.

In a possible implementation, the target information includes a diffuse reflection coefficient. The grouping unit 1202 is configured to divide illumination data in the probe data into a plurality of probe data groups based on the diffuse reflection coefficient of the probe data of the plurality of probes.

In a possible implementation, the grouping unit 1202 is configured to: determine a first difference between each probe and at least one first target probe of the probe based on a diffuse reflection coefficient of probe data of the probe in the plurality of probes and a diffuse reflection coefficient of probe data of the at least one first target probe of the probe, where the first target probe is a probe whose distance from a position of the probe is less than a first threshold; and divide the illumination data in the probe data into the plurality of probe data groups based on the first difference.

In a possible implementation, the target information includes distance data. The grouping unit 1202 is configured to divide visibility data in the probe data into a plurality of probe data groups based on the distance data of the probe data of the plurality of probes.

In a possible implementation, the grouping unit 1202 is configured to: determine a second difference between each probe and at least one second target probe of the probe based on distance data of probe data of the probe in the plurality of probes and distance data of probe data of the at least one second target probe of the probe, where the second target probe of each probe is a probe whose distance from a position of the probe is less than a second threshold; and divide the visibility data in the probe data into the plurality of probe data groups based on the second difference.

In a possible implementation, the apparatus further includes an arrangement unit 1204.

The arrangement unit 1204 is configured to arrange the probe data into a two-dimensional picture based on a grouping status of the probe data, where the two-dimensional picture includes a plurality of picture blocks, and the plurality of picture blocks one-to-one correspond to the plurality of probe data groups.

The arrangement unit 1204 is configured to arrange the plurality of probe data groups into a plurality of two-dimensional pictures, where the plurality of two-dimensional pictures one-to-one correspond to the plurality of probe data groups.

In a possible implementation, the encoding unit 1203 is configured to: perform the first encoding on a picture block that is in the two-dimensional picture and that corresponds to the first probe data group to generate the first encoding result, and perform the second encoding on a picture block that is in the two-dimensional picture and that corresponds to the second probe data group to generate the second encoding result.

In a possible implementation, the arrangement unit 1204 is configured to arrange the probe data into the two-dimensional picture in an order of a Hilbert curve or a pseudo Hilbert curve based on the grouping status of the probe data.

In a possible implementation, the encoding unit 1203 is configured to: perform the first encoding on a two-dimensional picture that is in the plurality of two-dimensional pictures and that corresponds to the first probe data group to generate the first encoding result, and perform the second encoding on a two-dimensional picture that is in the plurality of two-dimensional pictures and that corresponds to the second probe data group to generate the second encoding result.

In a possible implementation, the first probe data group is a first probe data group that is in the plurality of probe data groups and that corresponds to a frame number of the current frame.

In a possible implementation, the encoding unit 1203 is further configured to determine the first probe data based on preset information, where the preset information indicates a correspondence between a group and a frame number.

In a possible implementation, the obtaining unit is further configured to obtain probe data in a non-current frame.

In a possible implementation, the bitstream includes grouping information, and the grouping information represents a grouping manner of the probe data.

In a possible implementation, the bitstream includes arrangement information, and the arrangement information represents arrangement information of the probe data.

In a possible implementation, the bitstream includes encoding information, and the encoding information represents an encoding scheme of the plurality of probe data groups.

In a possible implementation, the probe data includes ambient environment data, and the ambient environment data includes at least one of the following: the illumination data, the visibility data, a color, a material, a normal direction, or texture coordinates.

Figure 13:
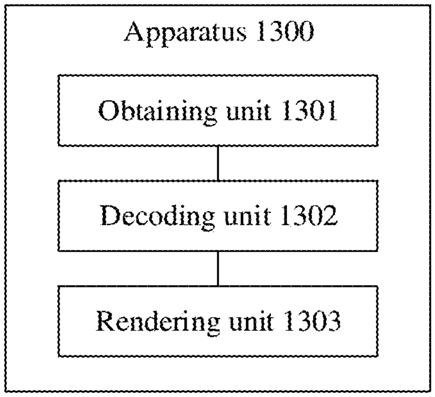
FIG. 13 is a diagram of a structure of a decoding apparatus according to an embodiment of this application.

The following describes, with reference to FIG. 13, a decoding apparatus configured to perform the foregoing decoding method.

It may be understood that, to implement the foregoing function, the decoding apparatus includes a corresponding hardware and/or software module for performing the function. With reference to algorithm steps of each example described in embodiments disclosed in this specification, embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of embodiments of this application.

In embodiments of this application, the decoding apparatus may be divided into functional modules based on the foregoing method examples. For example, each functional module may be obtained through division based on each corresponding function, or two or more functions may be integrated into one processing module. The foregoing integrated module may be implemented in a form of hardware. It should be noted that, in this embodiment, division into modules is an example, and is merely logical function division. During actual implementation, another division manner may be used.

When each functional module is obtained through division based on each corresponding function, FIG. 13 is a possible diagram of composition of the decoding apparatus in the foregoing embodiment. As shown in FIG. 13, the decoding apparatus 1300 may include an obtaining unit 1301, a decoding unit 1302, and a rendering unit 1303.

The obtaining unit 1301 is configured to obtain a bitstream, where the bitstream includes a plurality of pieces of probe data, and the plurality of pieces of probe data belong to a plurality of probe data groups.

For example, the obtaining unit 1301 may be configured to perform S1101 in the foregoing decoding method.

The decoding unit 1302 is configured to: perform first decoding on a first probe data group in the plurality of probe data groups to generate a first decoding result, perform second decoding on a second probe data group in the plurality of probe data groups to generate a second decoding result, and obtain probe data of a plurality of probes based on the first decoding result and the second decoding result. A decoding scheme of the first decoding is different from a decoding scheme of the second decoding.

For example, the decoding unit 1302 may be configured to perform S1102, S1103, and S1104 in the foregoing decoding method.

The rendering unit 1303 is configured to perform rendering based on the probe data.

For example, the rendering unit 1303 may be configured to perform S1105 in the foregoing decoding method.

In a possible implementation, the obtaining unit 1301 is further configured to: obtain grouping information, where the grouping information represents a grouping manner of the plurality of pieces of probe data; and group the plurality of pieces of probe data in the bitstream based on the grouping information to obtain the plurality of probe data groups.

In a possible implementation, the obtaining unit 1301 is configured to determine the grouping information based on the bitstream.

In a possible implementation, the obtaining unit 1301 is further configured to obtain decoding information, where the decoding information represents a decoding scheme of the plurality of probe data groups, and the decoding scheme includes the decoding scheme corresponding to the first decoding and the decoding scheme corresponding to the second decoding.

In a possible implementation, the obtaining unit 1301 is configured to determine the decoding information based on the bitstream.

In a possible implementation, the obtaining unit 1301 is further configured to obtain arrangement information, where the arrangement information represents an arrangement manner of the plurality of pieces of probe data.

In a possible implementation, the obtaining unit 1301 is configured to determine the arrangement information based on the bitstream.

In a possible implementation, the bitstream includes a two-dimensional picture, the two-dimensional picture includes a plurality of picture blocks, and the plurality of picture blocks one-to-one correspond to the plurality of probe data groups. The decoding unit 1302 is configured to: perform the first decoding on a picture block that is in the two-dimensional picture and that corresponds to the first probe data group to generate the first decoding result, and perform the second decoding on a picture block that is in the two-dimensional picture and that corresponds to the second probe data group to generate the second decoding result.

In a possible implementation, the bitstream includes a plurality of two-dimensional pictures, and the plurality of two-dimensional pictures one-to-one correspond to the plurality of probe data groups. The decoding unit 1302 is configured to: perform the first decoding on a two-dimensional picture that is in the plurality of two-dimensional pictures and that corresponds to the first probe data group to generate the first decoding result, and perform the second decoding on a two-dimensional picture that is in the plurality of two-dimensional pictures and that corresponds to the second probe data group to generate the second decoding result.

An embodiment of this application further provides an encoding apparatus. The apparatus includes at least one processor. When the at least one processor executes program code or instructions, the foregoing related method steps are implemented to implement the encoding method in the foregoing embodiment.

Optionally, the apparatus may further include at least one memory, and the at least one memory is configured to store the program code or the instructions.

An embodiment of this application further provides a decoding apparatus. The apparatus includes at least one processor. When the at least one processor executes program code or instructions, the foregoing related method steps are implemented to implement the decoding method in the foregoing embodiment.

Optionally, the apparatus may further include at least one memory, and the at least one memory is configured to store the program code or the instructions.

An embodiment of this application further provides a computer storage medium. The computer storage medium stores computer instructions. When the computer instructions are run on an encoding apparatus, the encoding apparatus is enabled to perform the foregoing related method steps to implement the encoding and decoding methods in the foregoing embodiments.

An embodiment of this application further provides a computer program product. When the computer program product runs on a computer, the computer is enabled to perform the foregoing related steps, to implement the encoding and decoding methods in the foregoing embodiments.

An embodiment of this application further provides a coding apparatus. The apparatus may be specifically a chip, an integrated circuit, a component, or a module. Specifically, the apparatus may include a connected processor and a memory configured to store instructions, or the apparatus includes at least one processor, configured to obtain instructions from an external memory. When the apparatus runs, the processor may execute the instructions, so that the chip performs the encoding and decoding methods in the foregoing method embodiments.

Figure 14:
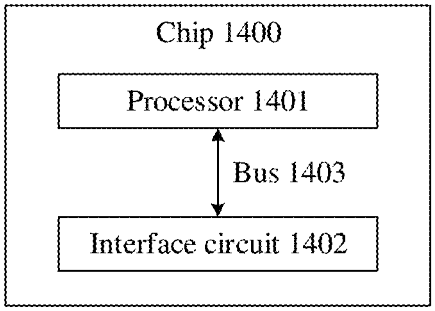
FIG. 14 is a diagram of a structure of a chip according to an embodiment of this application.

FIG. 14 is a diagram of a structure of a chip 1400. The chip 1400 includes one or more processors 1401 and an interface circuit 1402. Optionally, the chip 1400 may further include a bus 1403.

The processor 1401 may be an integrated circuit chip, and has a signal processing capability. In an implementation process, each step of the foregoing encoding and decoding methods may be completed through an integrated logic circuit of hardware in the processor 1401 or by using instructions in a form of software.

Optionally, the processor 1401 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1401 may implement or perform the methods and steps that are disclosed in embodiments of this application. The general-purpose processor may be a microprocessor, or the processor may be any conventional processor or the like.

The interface circuit 1402 may send or receive data, instructions, or information. The processor 1401 may process the data, the instructions, or other information received through the interface circuit 1402, and send, through the interface circuit 1402, information obtained through processing.

Optionally, the chip further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform a corresponding operation by invoking operation instructions (where the operation instructions may be stored in an operating system) stored in the memory.

Optionally, the chip may be used in the encoding apparatus or a DOP in embodiments of this application. Optionally, the interface circuit 1402 may be configured to output an execution result of the processor 1401. For the encoding and decoding methods provided in one or more of embodiments of this application, refer to the foregoing embodiments. Details are not described herein again.

It should be noted that functions corresponding to the processor 1401 and the interface circuit 1402 may be implemented by using a hardware design, may be implemented by using a software design, or may be implemented by using a combination of software and hardware. This is not limited herein.

The apparatus, the computer storage medium, the computer program product, or the chip provided in embodiments are all configured to perform the corresponding methods provided above. Therefore, for beneficial effect that can be achieved by the apparatus, the computer storage medium, the computer program product, or the chip, refer to beneficial effect of the corresponding methods provided above. Details are not described herein again.

It should be understood that sequence numbers of the foregoing processes do not mean execution sequences in all of embodiments of this application. The execution sequences of the processes should be determined based on functions and internal logic of the processes, and should not be construed as any limitation on the implementation processes of embodiments of this application.

A person of ordinary skill in the art may be aware that, with reference to the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this application.

It may be clearly understood by a person skilled in the art that, for ease and brevity of description, for a detailed working process of the foregoing system, apparatus, and unit, refer to a corresponding process in the foregoing method embodiments. Details are not described herein again.

In the several embodiments provided in embodiments of this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or units may be implemented in electrical, mechanical, or other forms.

The foregoing units described as separate parts may or may not be physically separate, and parts displayed as units may or may not be physical units, may be located at one location, or may be distributed on a plurality of network units. Some or all of the units may be selected based on an actual requirement to achieve the objectives of the solutions of embodiments.

In addition, functional units in all of embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk drive, a read-only memory (ROM), a random access memory (RAM), a magnetic disk, or a compact disc.

The foregoing descriptions are merely specific implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. An encoding method, comprising:

obtaining probe data of a plurality of probes arranged in a scene;

dividing the probe data into a plurality of probe data groups based on target information of the plurality of probes, wherein a first probe data group of the plurality of probe data groups comprises the probe data of a first subset of the plurality of probes, and a second probe data group of the plurality of probe data groups comprises the probe data of a second subset of the plurality of probes, and wherein the first subset and the second subset are disjoint subsets of the plurality of probes and each probe in the plurality of probes is assigned to one of the plurality of probe data groups based on the target information of the each probe;

performing first encoding on the first probe data group in the plurality of probe data groups to generate a first encoding result;

performing second encoding on the second probe data group in the plurality of probe data groups to generate a second encoding result, wherein an encoding scheme of the first encoding is different from an encoding scheme of the second encoding; and generating a bitstream based on the first encoding result and the second encoding result.

2. The method of claim 1, wherein the plurality of probe data groups comprise at least one probe data group comprising probe data in a current frame and probe data in a non-current frame, and the obtaining probe data of a plurality of probes comprises:

obtaining probe data of a plurality of probes in the current frame; and obtaining probe data of a plurality of probes in the non-current frame.

3. The method of claim 1, wherein the target information comprises a three-dimensional spatial position of each probe in of the plurality of probes, and the dividing the probe data into the plurality of probe data groups based on target information of the plurality of probes comprises:

dividing the probe data into the plurality of probe data groups based on the three-dimensional spatial position of each probe in the plurality of probes.

4. The method of claim 1, wherein the target information comprises a diffuse reflection coefficient, the probe data comprises illumination data, and the dividing the probe data into the plurality of probe data groups based on target information of the plurality of probes comprises:

dividing the illumination data into the plurality of probe data groups based on the diffuse reflection coefficient of the probe data.

5. The method of claim 4, wherein the dividing the illumination data into the plurality of probe data groups based on the diffuse reflection coefficient of the plurality of probes comprises:

determining a first difference between each probe of the plurality of probes and at least one first target probe of the plurality of probes based on a diffuse reflection coefficient of probe data of the each probe and a diffuse reflection coefficient of probe data of the at least one first target probe, wherein each of the at least one first target probe is a probe whose distance from a position of the each probe is less than a first threshold; and dividing the illumination data into the plurality of probe data groups based on the first difference.

6. The method of claim 1, wherein the target information comprises distance data, the probe data comprises visibility data, and the dividing the probe data into the plurality of probe data groups based on target information of the plurality of probes comprises:

dividing the visibility data into the plurality of probe data groups based on the distance data of the probe data.

7. The method of claim 6, wherein the dividing the visibility data into the plurality of probe data groups based on the distance data of the probe data comprises:

determining a second difference between each probe of the plurality of probes and at least one second target probe of the plurality of probes based on distance data of probe data of the each probe and distance data of probe data of the at least one second target probe, wherein each of the at least one second target probe is a probe whose distance from a position of the each probe is less than a second threshold; and dividing the visibility data into the plurality of probe data groups based on the second difference.

8. The method of claim 1, wherein the method further comprises:

arranging the probe data into a two-dimensional picture based on a grouping status of the probe data, wherein the two-dimensional picture comprises a plurality of picture blocks, and the plurality of picture blocks one-to-one correspond to the plurality of probe data groups;

the performing first encoding on a first probe data group in the plurality of probe data groups to generate a first encoding result comprises:

performing the first encoding on a picture block that is in the two-dimensional picture and that corresponds to the first probe data group to generate the first encoding result; and the performing second encoding on a second probe data group in the plurality of probe data groups to generate a second encoding result comprises:

performing the second encoding on a picture block that is in the two-dimensional picture and that corresponds to the second probe data group to generate the second encoding result.

9. The method of claim 1, wherein the method further comprises:

arranging the plurality of probe data groups into a plurality of two-dimensional pictures, wherein the plurality of two-dimensional pictures one-to-one correspond to the plurality of probe data groups;

the performing first encoding on a first probe data group in the plurality of probe data groups to generate a first encoding result comprises:

performing the first encoding on a two-dimensional picture that is in the plurality of two-dimensional pictures and that corresponds to the first probe data group to generate the first encoding result; and the performing second encoding on a second probe data group in the plurality of probe data groups to generate a second encoding result comprises:

performing the second encoding on a two-dimensional picture that is in the plurality of two-dimensional pictures and that corresponds to the second probe data group to generate the second encoding result.

10. The method of claim 1, wherein the bitstream comprises at least one of grouping information, arrangement information, or encoding information, and the grouping information represents a grouping manner of the probe data, the arrangement information represents arrangement information of the probe data, the encoding information represents an encoding scheme of the plurality of probe data groups.

11. A decoding method, comprising:

obtaining a bitstream, wherein the bitstream comprises a plurality of pieces of probe data of a plurality of probes, and the plurality of pieces of probe data belong to a plurality of probe data groups based on target information of the plurality of probes, wherein a first probe data group of the plurality of probe data groups comprises the probe data of a first subset of the plurality of probes, and a second probe data group of the plurality of probe data groups comprises the probe data of a second subset of the plurality of probes, and wherein the first subset and the second subset are disjoint subsets of the plurality of probes and each probe in the plurality of probes is assigned to one of the plurality of probe data groups based on the target information of the each probe;

performing first decoding on the first probe data group in the plurality of probe data groups to generate a first decoding result;

performing second decoding on the second probe data group in the plurality of probe data groups to generate a second decoding result, wherein a decoding scheme of the first decoding is different from a decoding scheme of the second decoding;

obtaining probe data of the plurality of probes based on the first decoding result and the second decoding result; and performing rendering based on the probe data.

12. The method of claim 11, wherein the method further comprises:

obtaining grouping information, wherein the grouping information represents a grouping manner of the plurality of probe data groups; and grouping the plurality of pieces of probe data in the bitstream based on the grouping information to obtain the plurality of probe data groups.

13. The method of claim 11, wherein the method further comprises:

obtaining decoding information, wherein the decoding information represents a decoding scheme of the plurality of probe data groups, and the decoding scheme comprises the decoding scheme corresponding to the first decoding and the decoding scheme corresponding to the second decoding.

14. The method of claim 11, wherein the method further comprises:

obtaining arrangement information, wherein the arrangement information represents an arrangement manner of the plurality of pieces of probe data.

15. The method of claim 11, wherein the bitstream comprises a two-dimensional picture, the two-dimensional picture comprises a plurality of picture blocks, and the plurality of picture blocks one-to-one correspond to the plurality of probe data groups;

the performing first decoding on a first probe data group in the plurality of probe data groups to generate a first decoding result comprises:

performing the first decoding on a picture block that is in the two-dimensional picture and that corresponds to the first probe data group to generate the first decoding result; and the performing second decoding on a second probe data group in the plurality of probe data groups to generate a second decoding result comprises:

performing the second decoding on a picture block that is in the two-dimensional picture and that corresponds to the second probe data group to generate the second decoding result.

16. The method of claim 11, wherein the bitstream comprises a plurality of two-dimensional pictures, and the plurality of two-dimensional pictures one-to-one correspond to the plurality of probe data groups;

the performing first decoding on a first probe data group in the plurality of probe data groups to generate a first decoding result comprises:

performing the first decoding on a two-dimensional picture that is in the plurality of two-dimensional pictures and that corresponds to the first probe data group to generate the first decoding result; and the performing second decoding on a second probe data group in the plurality of probe data groups to generate a second decoding result comprises:

performing the second decoding on a two-dimensional picture that is in the plurality of two-dimensional pictures and that corresponds to the second probe data group to generate the second decoding result.

17. A decoding apparatus, comprising:

a memory configured to store instructions;

at least one processor coupled to the memory, and configured to execute the instructions to cause the decoding apparatus to:

obtain a bitstream, wherein the bitstream comprises a plurality of pieces of probe data of a plurality of probes, and the plurality of pieces of probe data belong to a plurality of probe data groups based on target information of the plurality of probes, wherein a first probe data group of the plurality of probe data groups comprises the probe data of a first subset of the plurality of probes, and a second probe data group of the plurality of probe data groups comprises the probe data of a second subset of the plurality of probes, and wherein the first subset and the second subset are disjoint subsets of the plurality of probes and each probe in the plurality of probes is assigned to one of the plurality of probe data groups based on the target information of the each probe;

perform first decoding on a first probe data group in the plurality of probe data groups to generate a first decoding result, perform second decoding on a second probe data group in the plurality of probe data groups to generate a second decoding result, and obtain probe data of a plurality of probes based on the first decoding result and the second decoding result, wherein a decoding scheme of the first decoding is different from a decoding scheme of the second decoding; and perform rendering based on the probe data.

18. The apparatus of claim 17, wherein the at least one processor is further configured to execute the instructions to cause the decoding apparatus to:

obtain grouping information, wherein the grouping information represents a grouping manner of the plurality of probe data groups; and group the plurality of pieces of probe data in the bitstream based on the grouping information to obtain the plurality of probe data groups.

19. The apparatus of claim 17, wherein the at least one processor is further configured to execute the instructions to cause the decoding apparatus to:

obtain decoding information, wherein the decoding information represents a decoding scheme of the plurality of probe data groups, and the decoding scheme comprises the decoding scheme corresponding to the first decoding and the decoding scheme corresponding to the second decoding.

* * * * *